US007268929B2

(12) United States Patent
Asai

(10) Patent No.: US 7,268,929 B2
(45) Date of Patent: Sep. 11, 2007

(54) OPTICAL SCANNER REFLECTING AND OUTPUTTING LIGHT INCREASED IN WIDTH AND IMAGE FORMING APPARATUS USING SAME

(75) Inventor: Nobuaki Asai, Hashima-gun (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 11/390,334

(22) Filed: Mar. 28, 2006

(65) Prior Publication Data

US 2006/0175546 A1 Aug. 10, 2006

Related U.S. Application Data

(63) Continuation of application No. PCT/JP2004/12959, filed on Sep. 7, 2004.

(30) Foreign Application Priority Data

Sep. 30, 2003 (JP) ............................ 2003-339150

(51) Int. Cl.
*G02B 26/08* (2006.01)

(52) U.S. Cl. ....................... 359/212; 359/213; 359/224

(58) Field of Classification Search ..................... None
See application file for complete search history.

(56) References Cited

U.S. PATENT DOCUMENTS 5,270,849 A * 12/1993 Bock et al. ................. 359/206

FOREIGN PATENT DOCUMENTS

| | | |
|---|---|---|
| EP | 1 339 211 A1 | 8/2003 |
| JP | A-63-225217 | 9/1988 |
| JP | A-05-276317 | 10/1993 |
| JP | A-08-082777 | 3/1996 |
| JP | A-11-203383 | 7/1999 |
| JP | A-2001-033727 | 2/2001 |
| JP | A-2002-131670 | 5/2002 |
| JP | A-2002-182147 | 6/2002 |
| JP | B2-3372265 | 11/2002 |
| JP | A-2003-043406 | 2/2003 |
| JP | A-2003-057586 | 2/2003 |
| JP | A-2003-241123 | 8/2003 |

* cited by examiner

*Primary Examiner*—James Phan
(74) *Attorney, Agent, or Firm*—Oliff & Berridge, PLC

(57) ABSTRACT

An optical scanner is disclosed which includes: a reflective surface from which incoming light is reflected; and a scanning sub-system altering an angle of the reflective surface, relative to an entry direction in which the incoming light enters the reflective surface, to thereby perform a scanning operation of reflected light from the reflective surface. The reflective surface is illuminated with illuminating light for the scanning operation, such that the illuminating light is so dimensioned in transverse cross-section as to together generate a desired segment of light entering the reflective surface and an undesired segment of light not entering the reflective surface.

20 Claims, 18 Drawing Sheets

OPTICAL SCANNER REFLECTING AND OUTPUTTING LIGHT INCREASED IN WIDTH AND IMAGE FORMING APPARATUS USING SAME

CROSS-REFERENCE TO RELATED APPLICATIONS

This application is based on Japanese Patent Applications No. 2003-339150 filed Sep. 30, 2003, and PCT International Patent Application No. PCT/JP2004/12959 filed Sep. 7, 2004, the contents of which are incorporated hereinto by reference.

This is a continuation of International Application No. PCT/JP2004/12959 filed Sep. 7, 2004, which was published in Japanese under PCT Article 21(2).

BACKGROUND OF THE INVENTION

1. Field of the Invention

The invention relates to an optical scanner altering an angle of a reflective surface reflecting the incoming light, relative to an entry direction in which the incoming light enters the reflective surface, to thereby perform a scanning operation of reflected light from the reflective surface, and more particularly to techniques of increasing in width, i.e., transverse cross-section the reflected light from the reflective surface.

2. Description of the Related Art

There are known as optical scanners for scanning light, such a type of an optical scanner that alters an angle of a reflective surface reflecting the incoming light, relative to an entry direction in which the incoming light enters the reflective surface, to thereby perform a scanning operation of the reflected light from the reflective surface. See, for example, Japanese Patent Application Publication No. HEI 11-203383.

Such an optical scanner is used in many various fields, such as image forming, and image reading. In the field of image forming, such an optical scanner is applied to retinal scanning type display devices which scan a beam of light on the retina of a viewer for direct presentation of a desired image onto the retina; projectors; laser printers; devices for use in laser lithography; or other applications. In the field of image reading, such an optical scanner is applied to facsimile machines; copiers; image scanners; bar-code readers; or other applications.

An example of such an optical scanner is of a type in which oscillation of a reflective surface achieves the scanning of light. Another example of such an optical scanner is of a type in which unidirectional rotation of a reflective surface achieves the scanning of light.

As disclosed in Japanese Patent Application Publication No. HEI 11-203383, an example of the above-described oscillating type optical scanner is constructed to include a mirror reflecting light; and a vibrating body for torsion-vibrating the mirror.

While this example falls within a type of an optical scanner that performs the oscillation of a reflective surface through its vibration, there exists an alternative type of an optical scanner that performs the oscillation of a reflective surface without through its vibration. A more specific example of the alternative type is an optical scanner utilizing a galvano mirror.

In contrast, an example of the above-described rotating type optical scanner is constructed to utilize a polygon mirror having a plurality of adjacent mirror facets in succession around the polygon mirror. The optical scanner utilizing the polygon mirror differs in that successive uses of the plurality of mirror facets achieve repeated scans, from the optical scanner oscillating a reflective surface in which continuous use of the same reflective surface achieves repeated scans.

BRIEF SUMMARY OF THE INVENTION

The optical scanner described above, for achieving, for example, higher resolution, is required in some cases, to be configured to concurrently achieve an increased scan rate, an increased scan amplitude (the magnitude of the oscillation during scan), and a maximized area of a transverse cross-section of the reflected light from the reflective surface, namely, the scanning light produced by the instant optical scanner.

In this context, the "transverse cross-sectional area" means, when the reflected light is, for example, in the form of a beam of light having a circular cross section, the area of a circle identical in diameter to the beam of light. In this example, there is established a relationship for the reflected light that the larger the beam diameter, the larger the transverse cross-sectional area.

Next, the above requirements will be described below in greater detail by way of an example of such an optical scanner that torsion-vibrates a reflective mirror member which has a reflective surface and which is in support of an elastic beam member, to thereby oscillate the reflective surface for optical scan.

In this example, an increase in the transverse cross-sectional area of the reflected light from the reflective surface requires an increase in the transverse cross-sectional area of the incoming light of the reflective surface. The larger the area of the reflective surface is, the more easily the transverse cross-sectional area of the incoming light can be increased.

However, various reasons create limitations in increasing the area of the reflective surface. In an example where the instant optical scanner is desired to achieve higher resolution, with concurrent achievement of a desired scanning frequency and a desired scan angle, there can be provided a trade-off among these three factors.

Describing the trade-off in greater detail, an increase in size of the reflective mirror member having the reflective surface formed therein, which is for the ultimate goal of achieving higher resolution through an increase in area of the reflective surface, entails an increase in mass of the reflective mirror member. There is found a tendency that the increase in mass of the reflective mirror member invites an increase in inertia (e.g., a moment of inertia) of the reflective mirror member, and eventually invites a drop in the scanning frequency of the reflective mirror member.

An increase in the scanning frequency irrespective of the above existing tendency requires an increase in stiffness of the aforementioned elastic beam member. However, the increase in stiffness of the elastic beam member, since it entails an increase in the torsional stiffness of the elastic beam member, unavoidably creates a tendency that a maximum scan angle of the reflective mirror member (the angular range of scanning) is reduced.

For the above reasons, the above example of a torsional vibration type has limitations in achieving higher resolution by increasing the area of the reflective surface.

A conventional optical scanner, as is the case described above, is configured, such that a transverse cross-section of illuminating light striking a reflective surface is dimensioned, on the light-entrance condition that the illuminating light must enter the reflective surface without overflow therefrom.

More specifically, the transverse cross-section is dimensioned to leave a marginal or extra space, i.e., a non-entrance region which light does not enter, between an entrance region of the reflective surface which light enters and an outer peripheral edge of the reflective surface, to thereby continuously satisfy the above light-entrance condition irrespective of unintended variations in quality of manufactures and temporal changes in quality of individual manufactures.

As is evident from the above, a conventional optical scanner, although it has strict constraints on an attempt to increase the area of the reflective surface, fails to deploy the limited entire area of the reflective surface for optical scan.

It is therefore an object of the present invention to provide an optical scanner which alters an angle of a reflective surface reflecting the incoming light, relative to an entry direction in which the incoming light enters the reflective surface, to thereby perform a scanning operation of reflected light from the reflective surface, and which allows the area of the transverse cross-section of the reflected light to easily become large for the area of the reflective surface.

According to the present invention, an optical scanner is provided which comprises:

a reflective surface from which incoming light is reflected; and a scanning sub-system altering an angle of the reflective surface, relative to an entry direction in which the incoming light enters the reflective surface, to thereby perform a scanning operation of reflected light from the reflective surface, wherein the reflective surface is illuminated with illuminating light for the scanning operation, such that the illuminating light is so dimensioned in transverse cross-section as to together generate a desired segment of light entering the reflective surface and an undesired segment of light not entering the reflective surface.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
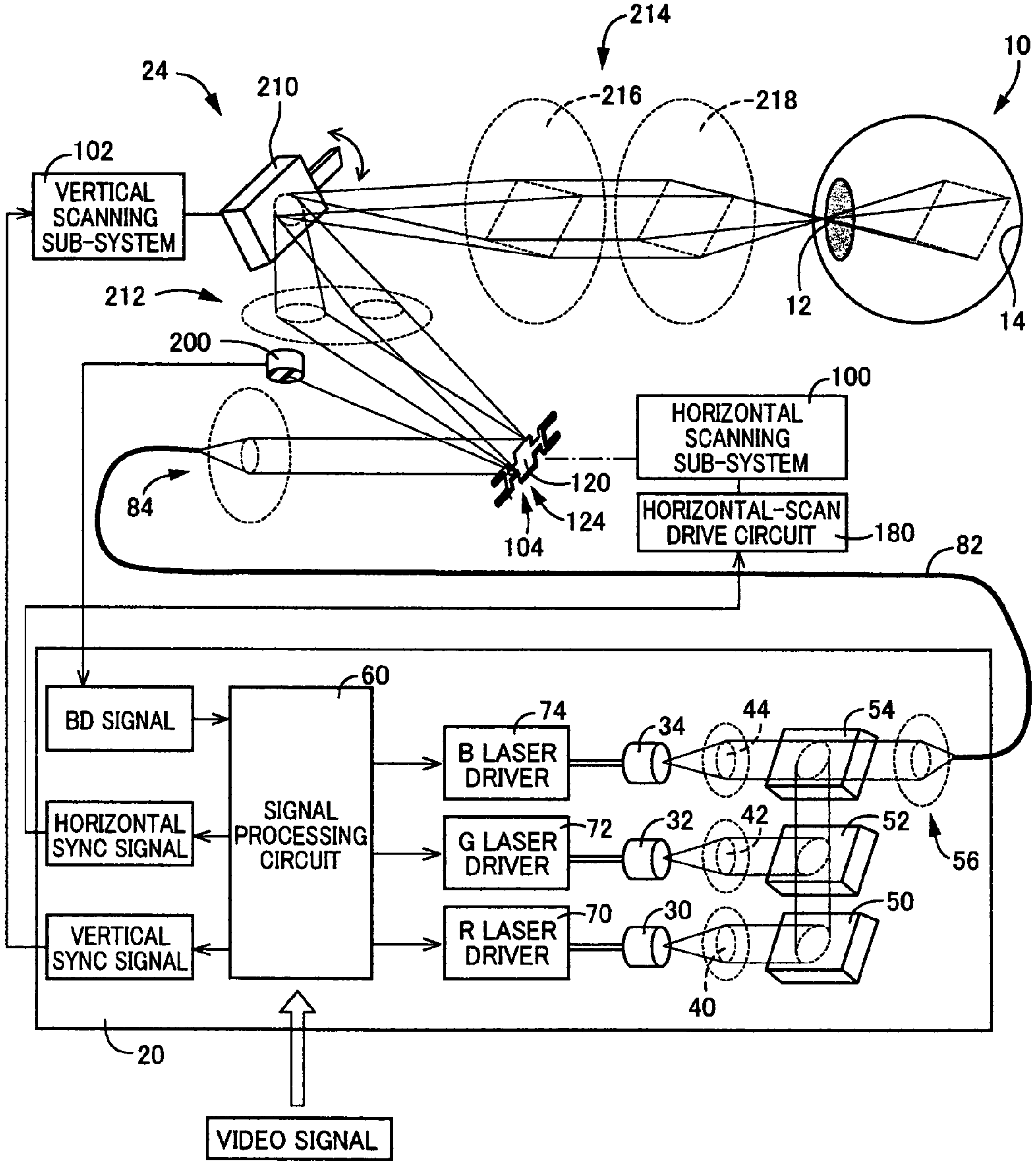
FIG. 1 is a schematic view illustrating a retinal scanning type display device including an optical scanner 104 constructed according to a first embodiment of the present invention.

The object mentioned above may be achieved according to any one of the following modes of this invention.

These modes will be stated below such that these modes are sectioned and numbered, and such that these modes depend upon the other mode or modes, where appropriate. This is for a better understanding of some of a plurality of technological features and a plurality of combinations thereof disclosed in this description, and does not mean that the scope of these features and combinations is interpreted to be limited to the scope of the following modes of this invention.

That is to say, it should be interpreted that it is allowable to select the technological features which are stated in this description but which are not stated in the following modes, as the technological features of this invention.

Furthermore, stating each one of the selected modes of the invention in such a dependent form as to depend from the other mode or modes does not exclude a possibility of the technological features in a dependent-form mode to become independent of those in the corresponding depended mode or modes and to be removed therefrom. It should be interpreted that the technological features in a dependent-form mode is allowed to become independent according to the nature of the corresponding technological features, where appropriate.

(1) An optical scanner comprising:

a reflective surface from which incoming light is reflected; and a scanning sub-system altering an angle of the reflective surface, relative to an entry direction in which the incoming light enters the reflective surface, to thereby perform a scanning operation of reflected light from the reflective surface, wherein the reflective surface is illuminated with illuminating light for the scanning operation, such that the illuminating light is so dimensioned in transverse cross-section as to together generate a desired segment of light entering the reflective surface and an undesired segment of light not entering the reflective surface.

In some cases, there is a limitation in increasing the area of a reflective surface. In the presence of such a limitation, two cases can be considered.

In the first case, illuminating light directed toward the reflective surface for scanning is dimensioned to have a transverse cross-sectional area relatively small enough to cause the illuminating light to enter the reflective surface without overflow therefrom. In this case, the illuminating light is identical to the incoming light.

In contrast, in the second case, the illuminating light is dimensioned to have a transverse cross-sectional area relatively large enough to allow the illuminating light to be in-part overflowed away from the reflective surface. In this case, the illuminating light is so wide that the illuminating light is divided into a desired segment of light identical to the incoming light, and an undesired segment of light not identical to the incoming light.

The comparison between these two different cases suggests that the deployment of the limited entire area of the reflective surface for optical scanning is more difficult in the first case than in the second case.

This fact is found remarkable in particular when the transverse cross-section of the illuminating light and the reflective surface are greatly different in shape from each other, such as when the illuminating light is circular in transverse cross-section, while the reflective surface is rectangular.

Further, in general, for an optical scanner which is configured to satisfy a light-entrance condition that the illuminating light must enter the reflective surface without overflow therefrom, the illuminating light is dimensioned such that its transverse cross-section is smaller than the reflective surface, for continuously satisfying the light-entrance condition irrespective of unintended variations in quality between manufactures and temporal changes in quality of individual manufactures.

In view of the above, it is found that, even where the transverse cross-section of the illuminating light and the reflective surface are similar in shape to each other, such as when these shapes both are circular, the deployment of the limited entire area of the reflective surface for optical scanning is more difficult when the illuminating light is dimensioned to have a transverse cross-section causing the illuminating light to enter the reflective surface without overflow therefrom, than when the illuminating light is dimensioned to have a transverse cross-section allowing the illuminating light to be in-part overflowed away from the reflective surface.

In view of the above findings, the optical scanner according to the above mode (1) is configured, such that illuminating light directed toward the reflective surface for optical scanning is so dimensioned in transverse cross-section as to together generate a desired segment of light entering the reflective surface and an undesired segment of light not entering the reflective surface.

The optical scanner according to the above mode (1) therefore enables the configuration of the transverse cross-section of the illuminating light, with the illuminating light being allowed to generate an undesired segment of light, resulting in enhanced deployment of the limited entire area of the reflective surface for optical scanning.

The “illuminating light” set forth in the above mode (1) is no more than light allowing concurrent generation of a desired and an undesired segment of light. By the definition, the “illuminating light” is not required to be dimensioned such that the desired segment of light completely fills an entire region of the reflective surface.

That is to say, the transverse cross-section of the illuminating light may be dimensioned so as to form a local region on the reflective surface which the desired segment of light does not fill.

(2) The optical scanner according to mode (1), further comprising a lower-reflectivity region configured to reflect the undesired segment of light with reflectivity lower than reflectivity with which the reflective surface reflects the desired segment of light.

The optical scanner according to the previous mode (1) is configured in some cases, such that there is generated an undesired segment of light which does not enter the reflective surface, and such that there is formed a light-entrance area which the undesired segment of light enters.

In those cases, the light-entrance area, upon entry of the undesired segment of light, generates reflected light from the light-entrance area, if no appropriate measures are taken. Such reflected light is disturbing reflected-light which may adversely affect normal reflected-light originating from the reflective surface.

In this regard, the optical scanner according to the above mode (2) is constructed to have a lower-reflectivity region (poorly-reflective region) configured to reflect the undesired segment of light with reflectivity lower than reflectivity with which the reflective surface reflects the desired segment of light.

The lower-reflectivity region may be, for example, in the form of a solid and lower-reflectance area which allows the undesired segment of light to impinge on the solid area and which causes the impinging light to be reflected from the solid area with lower reflectance or at a smaller reflection-ratio or -index than that of the reflective surface.

Alternatively, the lower-reflectivity region may be, for example, in the form of a light-passing area which allows the undesired segment of light to be passed through a through-hole or a cut-out of the light-passing area, without any optical interaction, and therefore without any reflection.

The above-exemplified lower-reflectance area is different from the above-exemplified light-passing area in that, while the lower-reflectance area allows the undesired segment of light to enter a solid portion of the lower-reflectance area and to be optically interacted, the light-passing area does not allow the undesired segment of light to be optically interacted.

However, the lower-reflectance area and the light-passing area are in common to each other in that both areas provide the function of suppressing conversion of an undesired segment of light into light which disturbs or interferes with normal reflected-light originating from the reflective surface.

As a result, the optical scanner according to the above mode (2), although it utilizes light for illumination directed toward the reflective surface, a portion of which is an undesired segment of light not entering the reflective surface, suppresses conversion of the undesired segment of light into light which disturbs or interferes with normal reflected-light originating from the reflective surface.

Therefore, the optical scanner according to the above mode (2) easily achieves the increase in the area of the transverse cross-section of the incoming light entering the reflective surface, without any negative effects on the normal reflected-light from the reflective surface.

(3) The optical scanner according to mode (2), wherein the lower-reflectivity region comprises a lower-reflectance area which the undesired segment of light enters and which reflects the entered undesired segment of light with reflectance lower than reflectance with which the reflective surface reflects the desired segment of light.

In the context of the above mode (3), the phrase "reflects the entered undesired segment of light with reflectance lower than reflectance with which the reflective surface reflects the desired segment of light" may be interpreted, with emphasis on light reflection which is one of phenomena optically found in the lower-reflectance area, to encompass an optical solution in which the disturbing reflected-light, namely, the undesired segment of light entered into the lower-reflectance area is scattered or deflected by reflection on the lower-reflectance area, to thereby prevent entry of the light reflected from the lower-reflectance area into a predetermined target entrance-position into which the normal reflected-light is intended to be entered from the reflective surface.

Alternatively, the above phrase may be interpreted, with emphasis on light refraction which is another one of phenomena optically found in the lower-reflectance area, to encompass an optical solution in which reflection from the lower-reflectance area (e.g., generation of light having a certain frequency reflected from the lower-reflectance area) is prevented, even if the undesired segment of light is entered into the lower-reflectance area.

Academically, the latter solution seemingly falls within anti-reflection in the narrow sense. However, the term "anti-reflection" is used in the broad sense throughout the written description to mean an optical solution placing restrictions on conversion of light entering the lower-reflectance area into light which is reflected from the lower-reflectance area into the target light-entrance position.

(4) The optical scanner according to mode (3), wherein the lower-reflectance area has a light-entrance surface which the undesired segment of light enters and which is rougher than the reflective surface.

The optical scanner according to the above mode (4), as a result of the light-entrance surface of the lower-reflectance area being rougher than the reflective surface, achieves lower reflection mainly through light scattering and absorption.

(5) The optical scanner according to mode (3) or (4), wherein the lower-reflectance area has a light-entrance surface which the undesired segment of light enters and which is coated with an anti-reflection coating.

The optical scanner according to the above mode (5), as a result of the light-entrance surface of the lower-reflectance area being coated with an anti-reflection coating, achieves lower reflection mainly through light refraction (anti-reflection in the narrow sense) or the process of lowering reflectance (e.g., blackening process).

(6) The optical scanner according to any one of modes (2) through (5), wherein the lower-reflectivity region comprises a light-passing area allowing passing of the undesired segment of light without reflection.

The optical scanner according to the above mode (6) allows the lower-reflectance area to cause the undesired segment of light to pass without reflection, resulting in prevention of the undesired segment of light from being converted into disturbing reflected-light directed toward the normal reflected-light from the reflective surface.

(7) The optical scanner according to any one of modes (2) through (6), wherein the scanning sub-system includes an oscillating member oscillating together with the reflective surface for the scanning operation, wherein the lower-reflectivity region is formed at the oscillating member.

For such an optical scanner that includes an oscillating member which oscillates together with a reflective surface for optical scan, the possibility exists that the oscillating member, upon entry of an undesired segment of light, reflects it as disturbing reflected-light which travels along normal reflected-light from the reflected light.

The disturbing reflected-light, if it travels in parallel to the normal reflected-light, adversely affects the resulting light produced for optical scan.

In this regard, the optical scanner according to the above mode (7), because of the lower-reflectivity region being disposed at the oscillating member, suppresses the generation of the disturbing reflected-light directed along the normal reflected-light from the reflective surface.

(8) The optical scanner according to mode (7), further comprising:

a reflective mirror member at which the reflective surface is formed; and an elastic beam member connected with the reflective mirror member for allowing torsional vibration of the reflective mirror member.

(9) The optical scanner according to mode (8), wherein the beam member functions as the oscillating member, and wherein the lower-reflectivity region is formed at at least a part of the beam member which is disposed adjacent to the reflective surface.

The optical scanner according to the above mode (9), even when a portion of illuminating light for illumination of the reflective surface enters the reflective surface, to constitute the desired segment of the light, and when, concurrently, another portion of the same illuminating light enters an adjacent area of the beam member to the reflective surface, to constitute the undesired segment of light, suppresses conversion of the undesired segment of light into the disturbing reflected-light, resulting from the adjacent area being formed as the lower-reflectivity region.

(10) The optical scanner according to mode (8) or (9), wherein the reflective mirror member configured to have an obverse face at which the reflective surface is formed and a non-obverse face excluding the obverse face, for functioning as the oscillating member, and wherein the lower-reflectivity region is formed at at least a part of the non-obverse face.

The optical scanner according to the above mode (10), even when a portion of illuminating light for illumination of the reflective surface enters the reflective surface formed at the obverse face of the reflective mirror member, to constitute the desired segment of the light, and when, concurrently, another portion of the same illuminating light enters the non-obverse face of the same reflective mirror member excluding the obverse face, to constitute the undesired segment of light, suppresses conversion of the undesired segment of light into the disturbing reflected-light, resulting from at least a part of the non-obverse face being formed as the lower-reflectivity region.

(11) The optical scanner according to mode (10), wherein the non-obverse face includes a lateral face adjacent to the obverse face, the lateral face disposed to acutely intersect the obverse face at its outer edge.

For an optical scanner provided with a reflective mirror member including an obverse face at which a reflective surface is formed, and a lateral face disposed adjacent to the obverse face, illuminating light for illumination of the reflective surface attempts to enter the reflective mirror member, such that a portion of the illuminating light attempts to enter the obverse face as the desired segment of light, and such that another portion of the same illuminating light attempts to concurrently enter the lateral face as the undesired segment of light.

In this regard, consider the case where the above optical scanner is configured with the lateral face being disposed to intersect perpendicularly the obverse face at its outer edge.

In this case, the lateral face is variably oriented relative to the direction of the illuminating light, during oscillation of the reflective mirror member, such that the lateral face is parallel to the illuminating light when the reflective surface is in a neutral position (frontally facing the incoming illuminating light), while the lateral face faces obliquely the incoming illuminating light when the reflective surface is situated out of the neutral position.

For this reason, if no appropriate measures are taken, then the undesired segment of light is likely to enter and then reflect off the lateral face to create disturbing reflected-light.

In contrast, the optical scanner according to the above mode (11), because of the lateral face being disposed to intersect acutely the obverse face at its outer edge, eliminates the likelihood that the lateral face faces or interferes with the illuminating light, even when the reflective surface is situated out of the neutral position.

Therefore, the optical scanner according to the above mode (11) eliminates the likelihood that the undesired segment of light enters and then reflects off the lateral face to create disturbing reflected-light.

(12) The optical scanner according to any one of modes (2) through (7), further comprising a stationary member held stationary during motion of the reflective surface, wherein the lower-reflectivity region is formed at the stationary member.

For an optical scanner provided with a stationary member held stationary during motion of the reflective surface, which is to say, during angular oscillation or unidirectional rotation of the reflective surface, if no appropriate measures are taken, the undesired segment of light is likely to enter and then reflect off the stationary member to create disturbing reflected-light.

In this regard, it is generally intended that the undesired segment of light travels along an optical path fixed spatially in an absolute space and then enters the reflective surface. Due to this, entry of such an undesired segment of light into the stationary member causes the stationary member to reflect the undesired segment of light to create disturbing reflected-light traveling in an unchanged direction.

However, the optical scanner according to the above mode (12), because of the formation of the lower-reflectivity region at the stationary member, suppresses continued generation of the disturbing reflected-light traveling in an unchanged direction.

(13) The optical scanner according to mode (12), wherein the scanning sub-system includes:

a main body oscillating the reflective surface for the scanning operation, the main body being formed as an integral combination of:

(a) a reflective mirror member at which the reflective surface is formed; (b) a fixed member; and (c) an elastic beam member supported by the reflective mirror member and the fixed member at both ends of the beam member, for allowing torsional vibration of the reflective mirror member; and a base to which the main body is to be attached.

(14) The optical scanner according to mode (13), wherein the fixed member functions as the stationary member, and wherein the lower-reflectivity region is formed at at least a part of the fixed member.

(15) The optical scanner according to mode (13) or (14), wherein the base functions as the stationary member, and wherein the lower-reflectivity region is formed at at least a part of the base.

(16) An apparatus for forming an image through scan of light, comprising:

a light source emitting the light; and a scanning unit scanning the light emitted from the light source, including an optical scanner, wherein the optical scanner includes:

a reflective surface from which incoming light is reflected; and a scanning sub-system altering an angle of the reflective surface, relative to an entry direction in which the incoming light enters the reflective surface, to thereby perform a scanning operation of reflected light from the reflective surface, wherein the reflective surface is illuminated with the light for the scanning operation, such that the light is so dimensioned in transverse cross-section as to together generate a desired segment of light entering the reflective surface and an undesired segment of light not entering the reflective surface.

The optical scanner set forth in the above mode (16) may be practiced in combination with at least one of the technical features described in the preceding modes (2) through (15).

(17) The apparatus according to mode (16), wherein the light source emits the light to illuminate the reflective surface, such that the light is so dimensioned in transverse cross-section as to together generate the desired segment of light and the undesired segment of light.

(18) The apparatus according to mode (16) or (17), wherein the scanning unit is configured to perform a primary scan for scanning the light in a primary scan direction, and performs a secondary scan for scanning the light in a secondary scan direction intersecting the primary scan direction at a rate lower than that of the primary scan, and wherein the optical scanner is used for performing the primary scan.

As described above, higher resolution of images requires an increase in the transverse cross-sectional area of the reflected light from the reflective surface.

In this regard, the apparatus according to the preceding mode (16) or (17), because of its employment of the optical scanner set forth in the preceding mode (16) or any other preceding mode, makes it easier for the reflected light to have the transverse cross-sectional area large for the area of the reflective surface.

It is followed that the required area of the reflective surface can become small for the area of the transverse cross-section of the reflected light, and eventually the required mass of a reflective mirror member of the reflective surface can become small for the area of the transverse cross-section of the reflected light.

On the other hand, there is found a tendency that the heavier the reflective mirror member, the lower the scanning frequency of the reflective surface.

The apparatus according to the above mode (18) is configured, such that the scanning unit performs the primary scan and the secondary scan in the secondary scan direction intersecting the primary scan direction at a rate lower than that of the primary scan. In the scanning unit, the optical scanner is used for performing the primary scan.

The comparison between the primary and secondary scans in the scanning frequency to be achieved suggests that the primary scan is higher in the scanning frequency than the secondary scan, meaning that the primary scan encounters more difficulties in achieving a desired scanning frequency than the secondary scan.

In contrast, the employment of the optical scanner set forth in the preceding mode (16) or any other preceding mode makes it easier to achieve higher resolution while avoiding reduction in the scanning frequency, as described above.

In view of the above, the apparatus according to the above mode (18) is configured to employ the optical scanner set forth in the preceding mode (16) for performing the primary scan, in which the beam of light is scanned at a higher rate or a higher frequency than in the secondary scan.

The apparatus according to the above mode (18) therefore makes it easier to allow the primary scan, which originally encounters more difficulties in concurrent achievement of both enhanced resolution and an increased frequency of scanning than the secondary scan, to successfully concurrently achieve both enhanced resolution and an increased frequency of scanning.

(19) The apparatus according to any one of modes (15) through (18), further comprising optics directing the beam of light scanned by the scanning unit, toward the retina of the viewer.

Several presently preferred embodiments of the invention will be described in more detail by reference to the drawings in which like numerals are used to indicate like elements throughout.

Referring now to FIG. 1, there is schematically illustrated a retinal scanning type display device constructed in accordance with a first embodiment of the present invention.

The retinal scanning type display device (hereinafter, abbreviated as "RSD") is adapted to direct a laser beam, through a pupil 12 of a viewer's eye 10, into an image plane on a retina 14 of the viewer, while appropriately modulating the laser beam in intensity (optionally with its curvature of wavefront). The RSD is further adapted to scan the laser beam two-dimensionally on the image plane, to thereby directly project a desired image onto the retina 14.

The RSD includes a light source unit 20 and a scanning unit 24 which is disposed between the light source unit 20 and the viewer's eye 10.

In order to generate a beam of laser light of any desired color by combining sub-beams of laser light of three primary colors (i.e., red, green, and blue), the light source unit 20 includes a laser 30 emitting a sub-beam of red colored laser light, a laser 32 emitting a sub-beam of green colored laser light, and a laser 34 emitting a sub-beam of blue colored laser light. These lasers 30, 32, and 34 each may be in the form of, for example, a semiconductor laser.

The sub-beams of laser light of three primary colors emitted from the respective lasers 30, 32, and 34, after collimation by respective collimating optical systems 40, 42, and 44, enter respective dichroic mirrors 50, 52, and 54 all of which are wavelength-selective. This is for causing the sub-beams of laser light to be selectively reflected from or transmitted through the respective dichroic mirrors 50, 52, and 54, in response to the wavelengths of these sub-beams of laser light, to thereby eventually combine the sub-beams of laser light.

More specifically, the sub-beam of red colored light emitted from the laser 30, after collimation by the collimating optical system 40, enters the dichroic mirror 50. The sub-beam of green colored light emitted from the laser 32, after collimation by the collimating optical system 42, enters the dichroic mirror 52. The sub-beam of blue colored light emitted from the laser 34, after collimation by the collimating optical system 44, enters the dichroic mirror 54.

The sub-beams of laser light of three primary colors, upon entry into the respective dichroic mirrors 50, 52, and 54, are combined together at the dichroic mirror 54, which is a representative one of the dichroic mirrors 50, 52, and 54. The combined sub-beams of laser light enter a combing optical system 56 for convergence.

Although the optical section of the light source unit 20 has been described above, then there will be described the electrical section of the light source unit 20.

The light source unit 20 includes a signal processing circuit 60 principally made by a computer. The signal processing circuit 60 is configured to perform, in response to an externally-supplied video signal, signal processing for driving the lasers 30, 32, and 34; and signal processing for implementing a scanning operation of the combined beam of laser.

In operation, the signal processing circuit 60 supplies drive signals for driving the lasers 30, 32, and 34, in response to the externally-supplied vide signal, for per pixel on the desired image to be projected onto the retina 14. These drive signals, which are required for the desired color and intensity of the combined beam of laser, are routed to the corresponding respective lasers 30, 32, and 34 via corresponding respective laser drivers 70, 72, and 74. The signal processing for scanning the laser beam will be described below.

The light source unit 20 described above emits the combined beam of laser at the combining optical system 56. The laser beam, after emerging from the combining optical system 56, enters and passes through an optical fiber 82 and a collimating optical system 84 in the description order, into the scanning unit 24. The optical fiber 82 functions as a light transmissive media or optical guide, and the collimating optical system 84 collimates the laser beam exiting divergently the optical fiber 82 at its rearward end.

The scanning unit 24 includes a horizontal scanning sub-system 100 and a vertical scanning sub-system 102.

The horizontal scanning sub-system 100 is an optical system for performing a horizontal scan (which is an example of a primary scan) in the form of a raster scan in which a laser beam is scanned along a plurality of horizontal scan lines, on a frame-by-frame basis, for an image to be displayed.

In contrast, the vertical scanning sub-system 102 is an optical system performing a vertical scan (which is an example of a secondary scan) in which a laser beam is scanned vertically from the primary scan line to the last scan line, on a frame-by-frame basis, for an image to be displayed.

The horizontal scanning sub-system 100 is configured to scan a laser beam at a rate or frequency higher than that of the vertical scanning sub-system 102.

More specifically, in the present embodiment, the horizontal scanning sub-system 100 includes an optical scanner 104. The optical scanner 104 has an elastic material provided with a mirror for performing mechanical deflection. The mirror is angularly oscillated by vibration of the elastic material. The optical scanner 104 is controlled in response to a horizontal sync signal supplied from the signal processing circuit 60.

Figure 2:
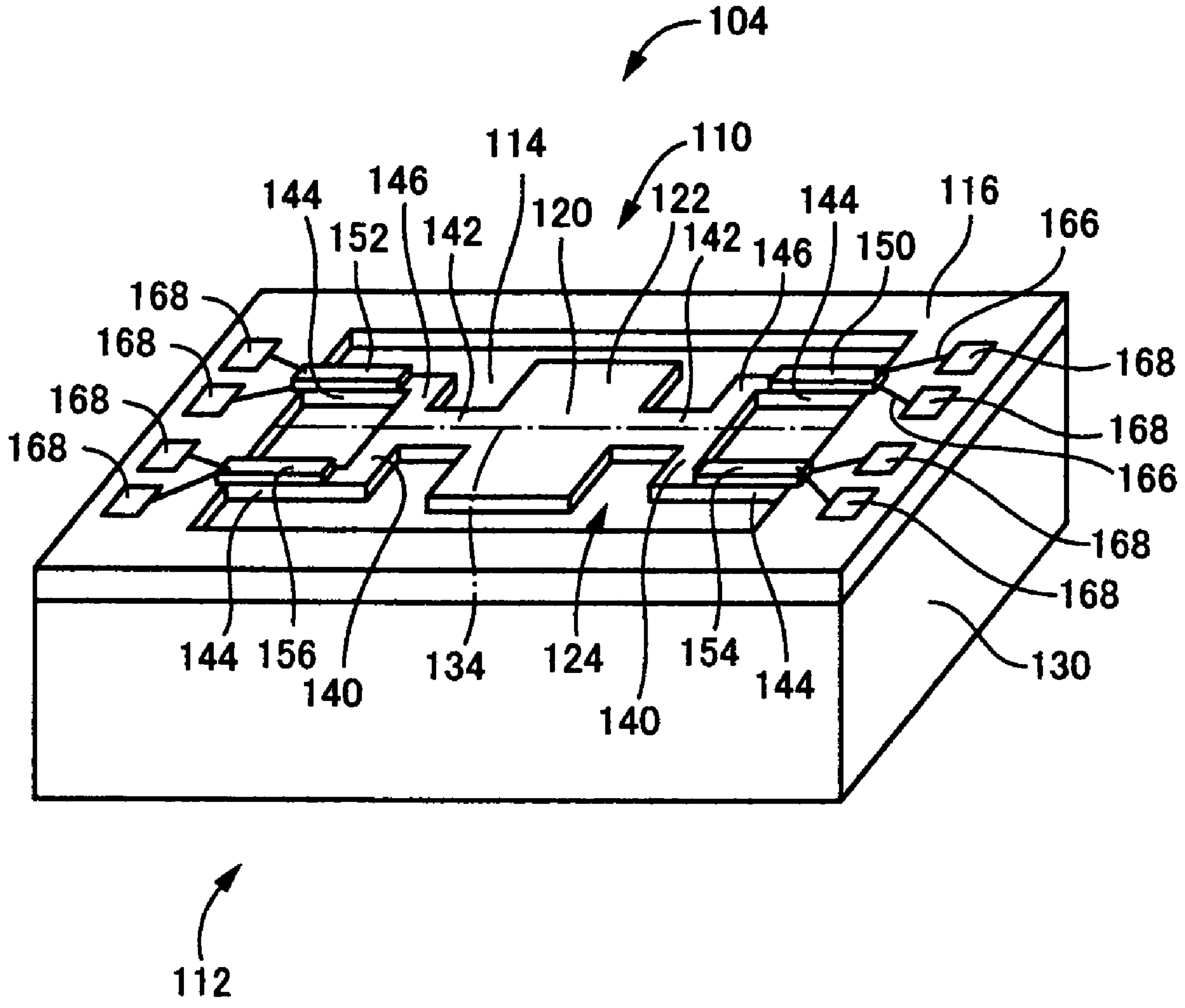
FIG. 2 is a perspective view illustrating the optical scanner 104 in an assembled state, as depicted in FIG. 1.
Figure 3:
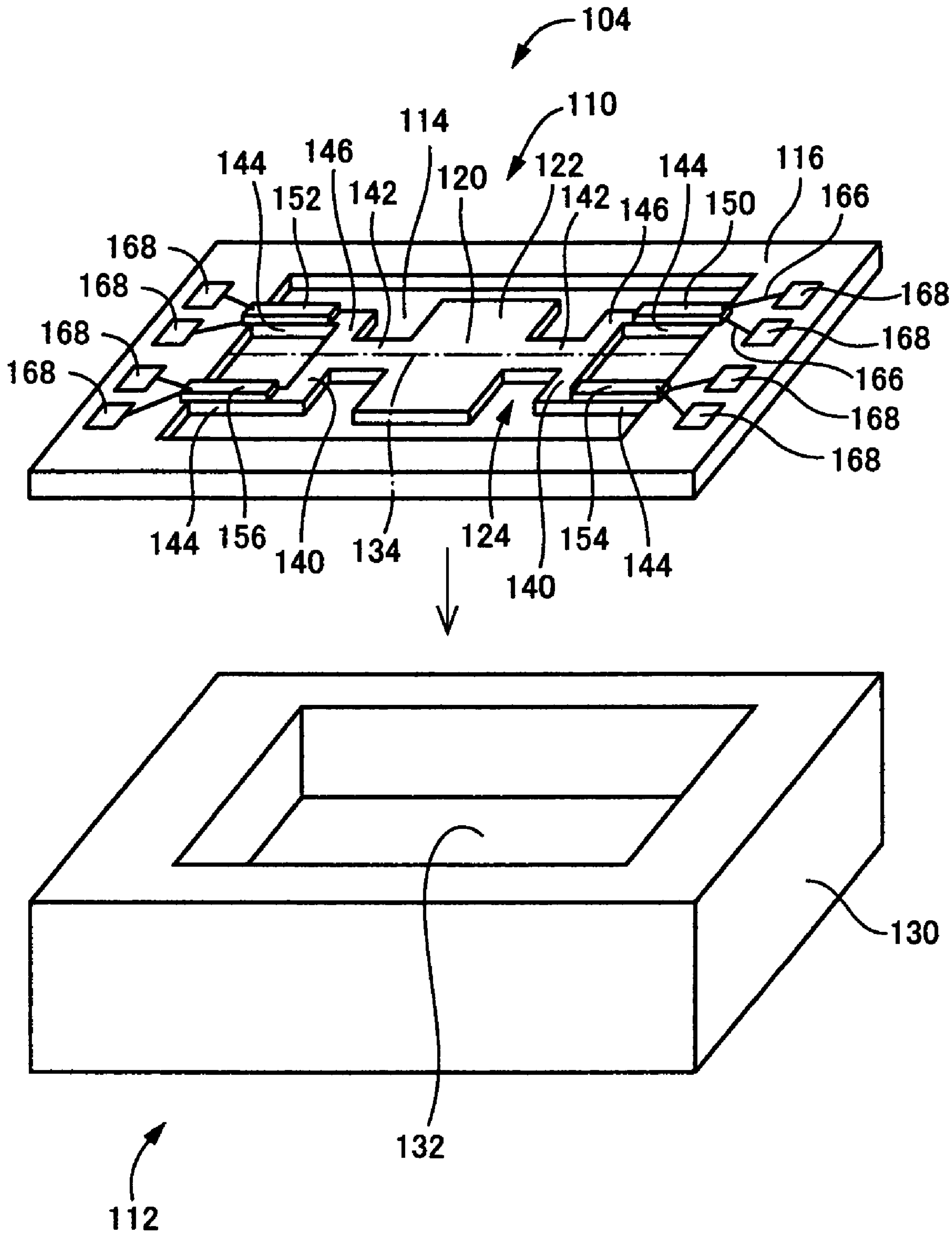
FIG. 3 is an exploded perspective view illustrating the optical scanner 104 depicted in FIG. 1.

FIG. 2 illustrates the optical scanner 104 in perspective view in an assembled state, while FIG. 3 illustrates the optical scanner 104 in exploded perspective view. As illustrated in FIGS. 2 and 3, the optical scanner 104 is fabricated by attaching a main body 110 to a base 112.

The main body 110 is made up of a material having elasticity such as silicon. As illustrated at the top of FIG. 3, the main body 110 is generally in the form of an elongate-rectangular thin-plate having a through hole 114 allowing light to pass therethrough.

The main body 110 includes, in an outer area thereof, a fixed frame 116, and on the other hand, includes, in an inner area thereof, an oscillating body 124 having a reflective mirror member 122 at which a reflective surface 120 is formed. In the present embodiment, an anti-reflection treatment, although will be described below in more detail, is applied to selected ones of the components of the optical scanner 104 by excluding the reflective surface 120.

Correspondingly to this configuration of the main body 110, the base 112, as illustrated at the bottom of FIG. 3, is configured to include a support 130 on which the fixed frame 116 is to be mounted, with the base 112 being attached to the main body 110. The base 112 is further configured to also include a recess 132 opposing to the oscillating body 124.

The recess 132 is shaped in the base 112 for providing clearance for angular oscillation of the oscillating body 124 by vibration without interference with the base 112, with the main body 110 being attached to the base 112.

As illustrated in FIG. 3, the reflective surface 120 of the reflective mirror member 122 is oscillated about an oscillation axis 134 which is also a line of symmetry of the reflective surface 120. The oscillating body 124 further includes a pair of beam members 140, 140 extending from the reflective mirror member 122 in a coplanar relationship for connection of the reflective mirror member 122 with the fixed frame 116. In the present embodiment, the pair of beam members 140, 140 extend out of opposite lateral faces of the reflective mirror member 122 in opposite directions, respectively.

Each beam member 140 is configured to include a mirror-side leaf spring 142, a pair of frame-side leaf springs 144, 144, and a connection 146 interconnecting the mirror-side leaf spring 142 and the pair of frame-side leaf springs 144, 144.

Each mirror-side leaf spring 142, belonging to a corresponding one of the pair of beam members 140, 140, extends from a corresponding one of the lateral faces of the reflective mirror member 122 which are opposed to each other in the direction of the oscillation axis 134. Each mirror-side leaf spring 142 extends from the corresponding lateral face into a corresponding one of the connections 146, 146 in and along the oscillation axis 134.

The pair of frame-side leaf springs 144, 144, belonging to a corresponding one of the pair of beam members 140, 140, coextend from a corresponding one of the connections 146, 146 along the oscillation axis 134, such that these beam members 140, 140 are offset oppositely with respect to the oscillation axis 134.

As illustrated in FIG. 3, for each beam member 140, actuators 150 and 152 or 154 and 156 are attached to the pair of frame-side leaf springs 144, 144, respectively, such that the actuators 150, 152, 154, and 156 extend to the fixed frame 116.

Figure 4:
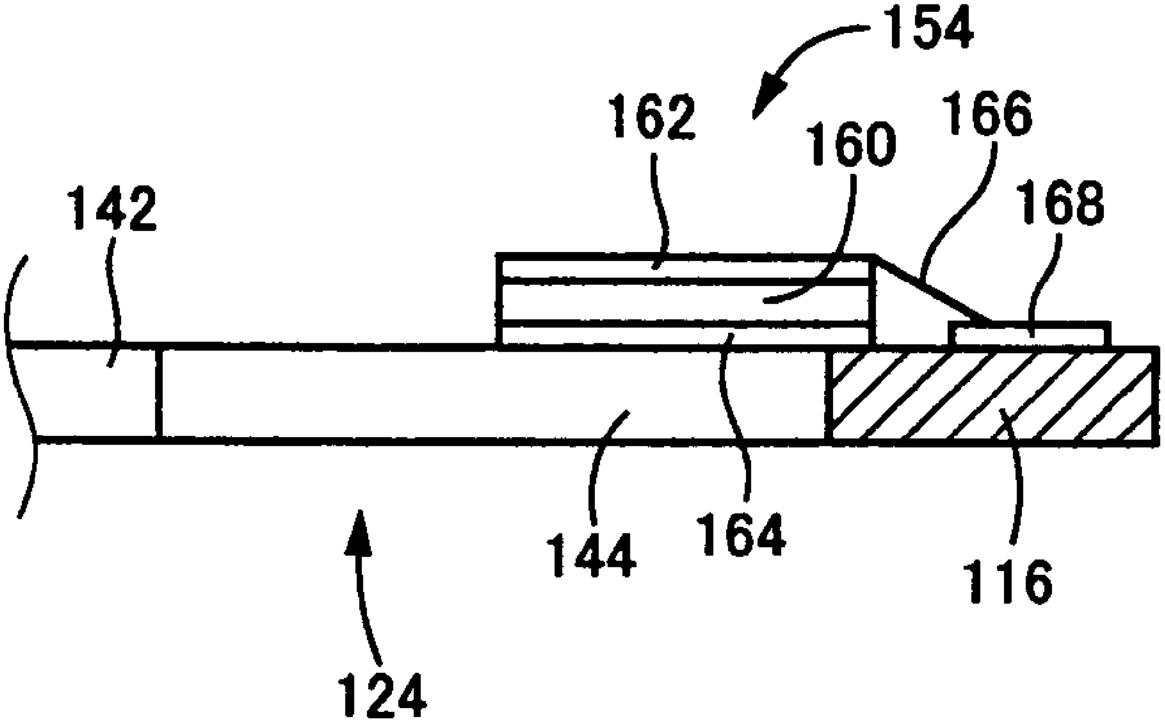
FIG. 4 is a longitudinal cross section in-part illustrating an oscillating body 124 depicted in FIG. 2.

As illustrated in FIG. 4, these actuators 150, 152, 154, and 156 are each fabricated principally with a piezoelectric material 160 (which is also referred to as "piezoelectric vibrator" or "piezoelectric element"). The piezoelectric material 160 is attached to one of both sides of the oscillating body 124, in the form of a thin plate, and is sandwiched between an upper electrode 162 and a lower electrode 164 which are opposed in a direction perpendicular to the plane of the oscillating body 124 onto which the piezoelectric material 160 is attached.

As illustrated in FIGS. 3 and 4, the upper electrode 162 and the lower electrode 164 are connected via corresponding respective lead wires 166, with a pair of terminals 168, 168 disposed at the fixed frame 116.

Figure 5:
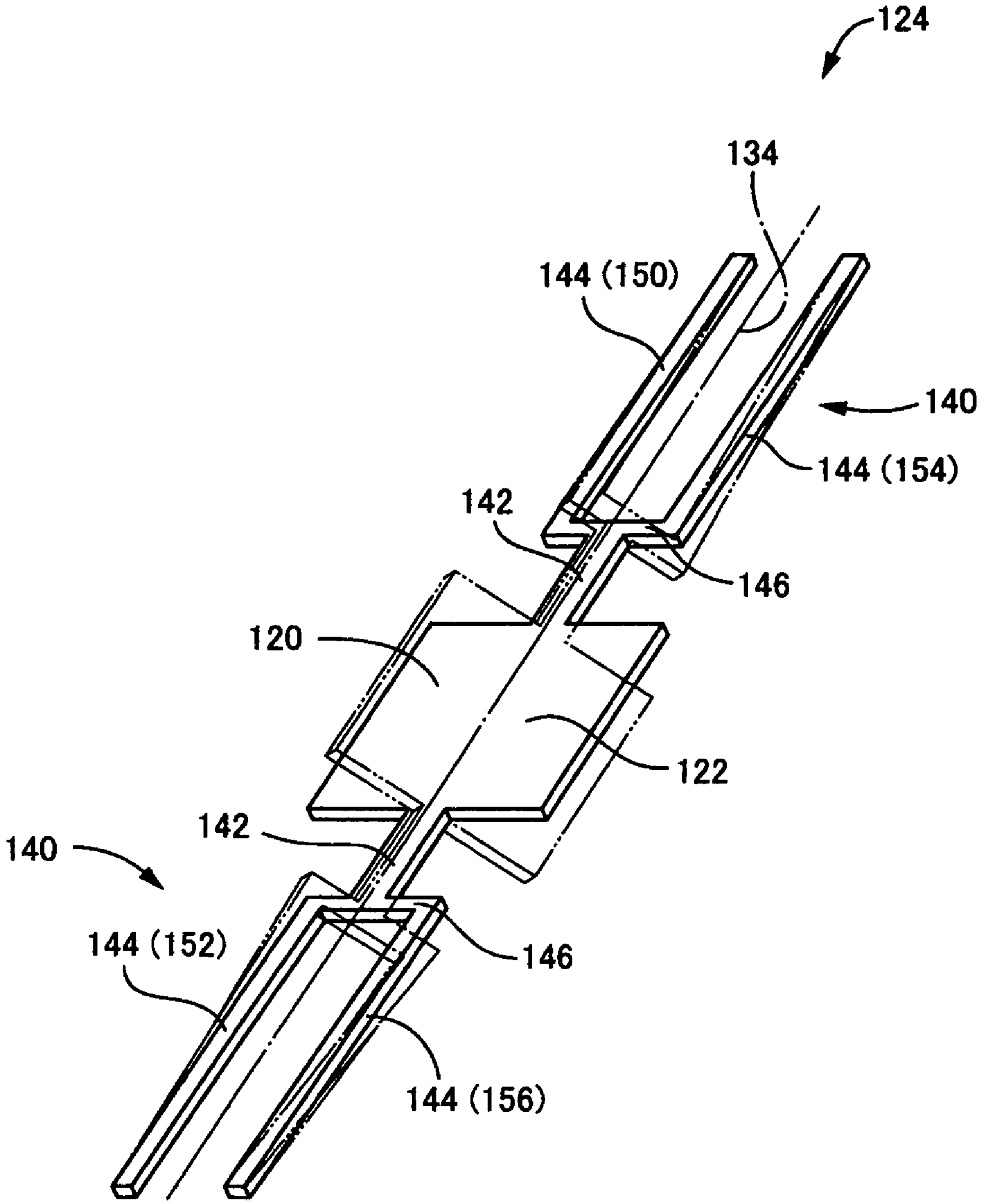
FIG. 5 is a perspective view illustrating the oscillating body 124 depicted in FIG. 2.

Application of a voltage to these upper and lower electrodes 162, 164 causes the piezoelectric material 160 to produce mechanical distortion in a direction perpendicular to that in which the voltage is applied. As illustrated in FIG. 5, the displacement causes each beam member 140 to produce flexure or deflection.

The flexure is produced such that a connection of each beam member 140 with the fixed frame 116 acts as a fixed end, while a connection of each beam member 140 with the reflective mirror member 122 acts as a free end. As a result, the free end displaces upwardly or downwardly depending on whether the flexure is produced upwardly or downwardly.

As is evident from FIG. 5, among the four actuators 150, 152, 154, and 156 attached to the four frame-side leaf springs 144, 144, 144, 144, respectively, a pair of the actuators 150 and 152 are located on one of both sides with respect to the oscillation axis 134, with the reflective mirror member 122 being interposed between these actuators 150 and 152, while a pair of the actuators 154 and 156 are located on the other side, with the reflective mirror member 122 being interposed between these actuators 154 and 156.

The pair of actuators 150 and 152 are deflected such that free ends of the corresponding respective two piezoelectric materials 160 and 160 are displaced in the same direction, and similarly, the pair of actuators 154 and 156 are deflected such that free ends of the corresponding respective two piezoelectric materials 160 and 160 are displaced in the same direction.

In contrast, a pair of the actuators 150 and 154 are located on one of both sides with respect to the reflective mirror member 122, with the oscillation axis 134 being interposed between these actuators 150 and 154, while a pair of the actuators 152 and 156 are located on the other side, with the oscillation axis 134 being interposed between these actuators 152 and 156.

The pair of actuators 150 and 154 are deflected such that free ends of the corresponding respective two piezoelectric materials 160 and 160 are displaced in opposite directions, and similarly, the pair of actuators 152 and 156 are deflected such that free ends of the corresponding respective two piezoelectric materials 160 and 160 are displaced in opposite directions.

As illustrated in FIG. 5, as a result of the above-described arrangement, the reflective mirror member 122 is rotated in an alternately-selected one of opposite rotational directions, owing to both the displacement produced in a first direction by the pair of actuators 150 and 152 located on one of both sides with respect to the oscillation axis 134, and the displacement produced in a second direction by the pair of actuators 152 and 156 located on the other side, wherein the second direction being opposite to the first direction.

That is to say, each frame-side leaf spring 144 has the function to convert linear displacement (lateral displacement) of the piezoelectric material 160 attached to each frame-side leaf spring 144 into flexure or bending motion (longitudinal displacement) thereof, while each connection 146 has the function to convert the flexure or bending motion of each frame-side leaf spring 144 into rotational motion of each mirror-side leaf spring 142. The rotational motion of the mirror-side leaf spring 142 causes the rotation of the reflective mirror member 122.

Therefore, in the present embodiment, for controlling of the four actuators 150, 152, 154, and 156, the two actuators 150 and 152, which are positioned on one of both sides with respect to the oscillation axis 134, that is, the upper right-hand actuator 150 and the upper left-hand actuator 152 as illustrated in FIG. 3 constitute a first pair. In addition, the two actuators 154 and 156, which are positioned on the opposite side, that is, the lower right-hand actuator 154 and the lower left-hand actuator 156 as illustrated in FIG. 3 constitute a second pair.

In the present embodiment, first voltages alternating in the same phase are applied to the two actuators 150 and 152 constituting the first pair, respectively, and second voltages alternating in the same phase are applied to the two remaining actuators 154 and 156 constituting the second pair, respectively, with the first and second voltages being opposite in phases.

This voltage application is performed for deflecting the first and second pairs in opposite directions, to thereby cause the reflective mirror member 122 to produce reciprocal rotation, that is, angular oscillation about the oscillation axis 134.

As a result, when both the two actuators 150 and 152 constituting the first pair are concurrently deflected downwardly as illustrated in FIG. 3, both the two remaining actuators 154 and 156 constituting the second pair are concurrently deflected upwardly as illustrated in FIG. 3.

Figure 6:
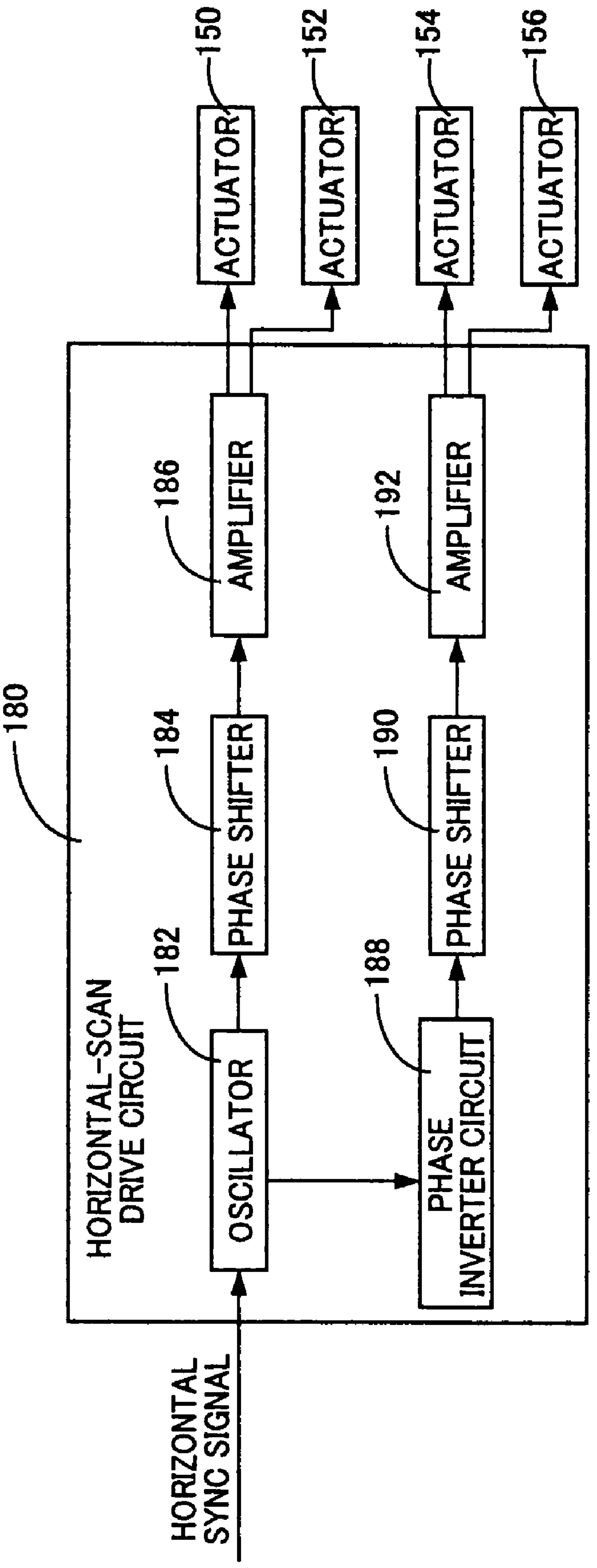
FIG. 6 is a block diagram illustrating the hardware construction of a horizontal-scan drive circuit 180 depicted in FIG. 1.

In order to achieve the above-described control, the horizontal scanning sub-system 100 includes a horizontal-scan drive circuit 180 illustrated in FIG. 1. For the horizontal-scan drive circuit 180, as illustrated in FIG. 6, an oscillator 182 generates an alternating voltage signal in response to the horizontal sync signal entered from the signal processing circuit 60.

The oscillator 182 is electrically coupled with the two actuators 150 and 152 constituting the first pair, via a first electrical pathway through a phase shifter 184 and an amplifier 186. The oscillator 182 is also electrically coupled with the two actuators 154 and 156 constituting the second pair, via a second electrical pathway through a phase inverter circuit 188, a phase shifter 190, and an amplifier 192.

The phase inverter circuit 188 is adapted to invert in phase the alternating voltage signal, upon receipt from the oscillator 182, and supplies the inverted alternating voltage signal to the phase shifter 190. Because the phase inverter circuit 188 is provided only for the second electrical pathway, the two actuators 150 and 152 constituting the first pair and the two remaining actuators 154 and 156 constituting the second pair are opposite in the phase of the alternating voltage signals supplied from the corresponding respective amplifiers 186 and 192.

The phase shifters 184 and 190 are provided for the function, which is in common to both the first and second electrical pathways, that the alternating voltage signals to be supplied to the actuators 150, 152, 154, and 156 are varied in phase for successful synchronization between the video signal and the oscillation of the reflective mirror member 122.

As illustrated in FIG. 1, the laser beam, upon scanned horizontally by the optical scanner 104 described above, is directed by a relay optical system 212 to the vertical scanning sub-system 102.

This RSD is provided with a beam detector 200 at a fixed position relative to this RSD. The beam detector 200 detects a laser beam which has been deflected by the optical scanner 104 (i.e., a laser beam which has been scanned in a primary scan direction), to thereby measure the position of the scanned laser beam in the primary scan direction. An example of the beam detector 200 may be a photodiode.

The beam detector 200 outputs a BD signal indicating that a scanned laser beam has reached a predetermined position, and the output BD signal is delivered to the signal processing circuit 60. In response to the delivery of the BD signal from the beam detector 200, the signal processing circuit 60 applies appropriate drive signals to the respective laser drivers 70, 72, and 74, upon elapse of a predetermined length of time since the beam detector 200 detected latest the laser beam.

This identifies the timing at which displaying an image is to be initiated on a per scan-line basis, and at the identified timing, displaying an image is initiated on a per scan-line basis.

In contrast to the horizontal scanning sub-system 100 which has been described above, the vertical scanning sub-system 102 includes a galvano mirror 210 as an oscillating mirror that causes mechanical deflection of a laser beam incident thereon.

The galvano mirror 210 is disposed to allow entry into the galvano mirror 210 of a laser beam after exiting the horizontal scanning sub-system 100 and being converged by the relay optical system 194. The galvano mirror 210 is oscillated about an axis of rotation intersecting the optical axis of the laser beam entering the galvano mirror 210. The start-up timing and the rotational speed of the galvano mirror 210 is controlled in response to a vertical sync signal supplied from the signal processing circuit 60.

The horizontal scanning sub-system 100 and the vertical scanning sub-system 102 both described above cooperate together to scan a laser beam two-dimensionally, and image light formed by the scanned laser beam enters the viewer's eye 10 via a relay optical system 214. In the present embodiment, the relay optical system 214 includes a plurality of relay optical elements 216 and 218 in an array along the optical path of the laser beam.

Figure 18:
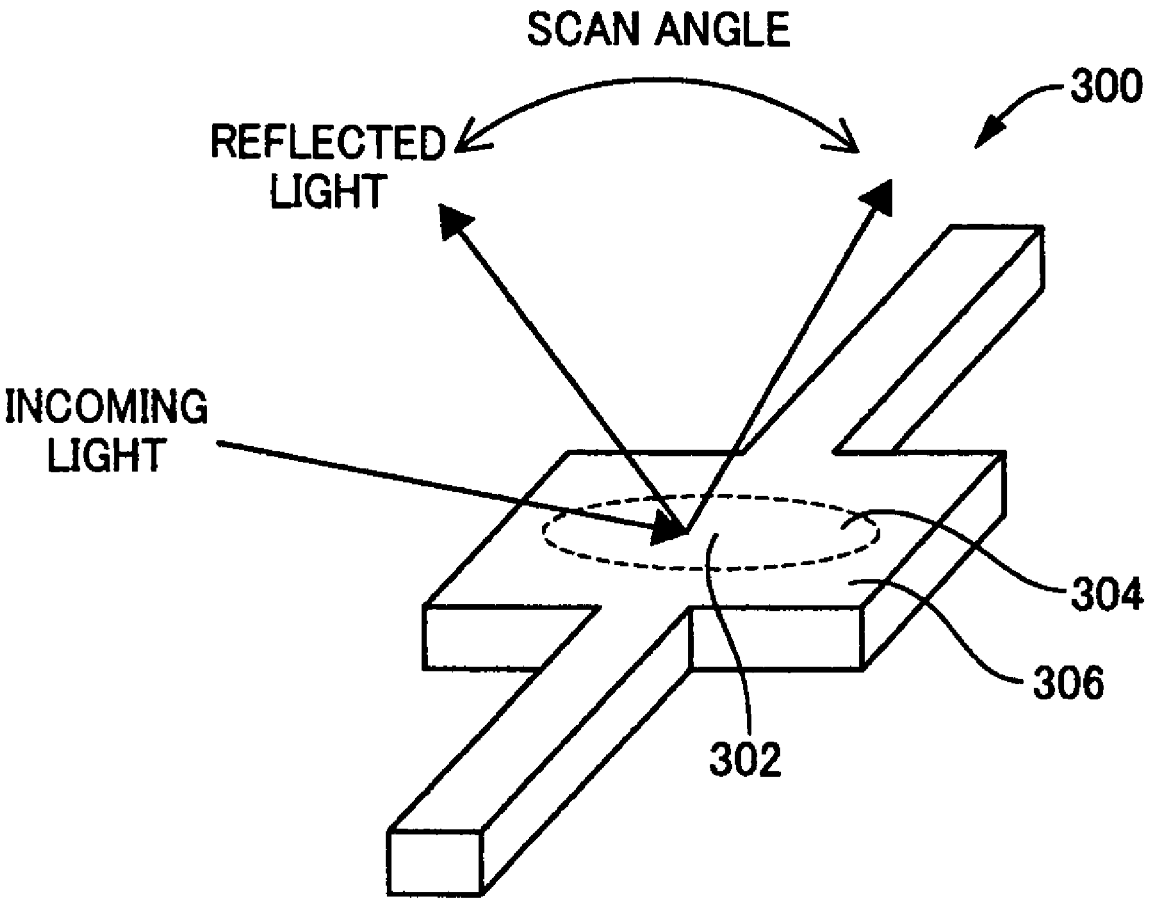
FIG. 18 is a perspective view for explaining a beam diameter of illuminating light for use in a conventional optical scanner 300.

As illustrated in FIG. 18, a conventional optical scanner 300 is configured concerning a beam diameter of a laser beam generally circular in section, which illuminates a reflective surface 302, on a light-entrance condition that the laser beam enters the reflective surface 302 without overflow therefrom.

More specifically, the beam diameter is dimensioned to form a non-entrance region 306 which light does not enter, between a light-entrance region 304 at which a laser beam enters the reflective surface 302, and an outer periphery of the reflective surface 302, for continuous satisfaction of the above light-entrance condition irrespective of unintended variations in quality between manufactures and temporal changes in quality of individual manufactures.

In contrast, for the optical scanner 104 in the present embodiment, a laser beam generally circular in section, which illuminates the reflective surface 120, is dimensioned in diameter to allow a portion of the laser beam to be overflown from the reflective surface 120.

More specifically, in the present embodiment, the beam diameter of the laser beam is predetermined to allow the laser beam to fill an entire region of the reflective surface 120, resulting in the beam diameter exceeding a maximum dimension of the reflective surface 120.

Figure 7:
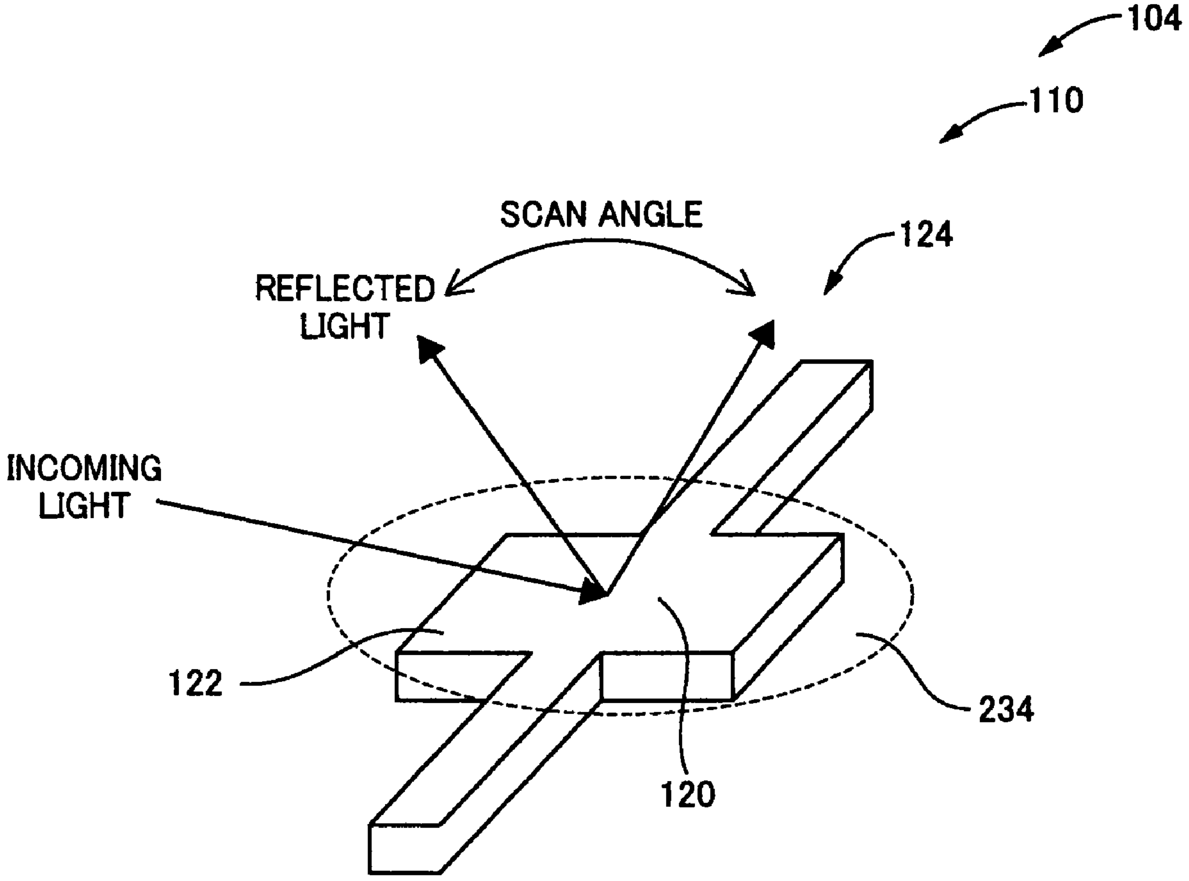
FIG. 7 is a perspective view for explaining a beam diameter of illuminating light for use in the optical scanner 104 depicted in FIG. 2.

As a result of the beam diameter being dimensioned in a manner mentioned above, in the present embodiment, as illustrated in FIG. 7, it follows that a laser beam directed toward the reflective surface 120 is provided a transverse cross-section 234 larger than the reflective surface 120. Accordingly, an entirety of illuminating light which is a laser beam directed toward the reflective surface 120 includes a desired segment of light which is incoming light entering the reflective surface 120, and an undesired segment of light which does not enter the reflective surface 120.

Figure 8:
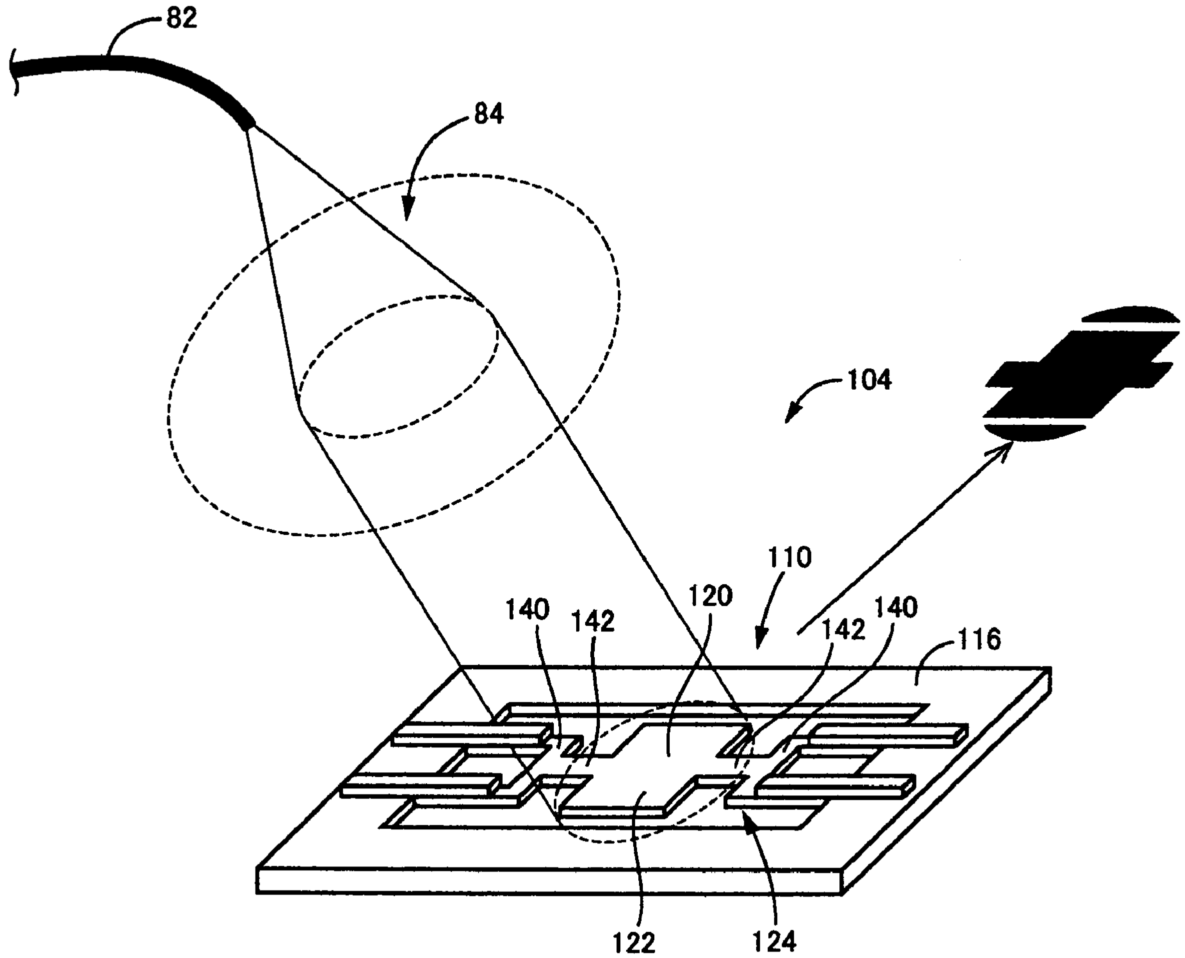
FIG. 8 is a perspective view for comparatively explaining reflected light emerging from the optical scanner 104 depicted in FIG. 2, as a result of the impingement of a laser beam on the optical scanner 104 which is not treated to be anti-reflective.

FIG. 8 illustrates a comparative example in which a laser beam larger in diameter than a maximum dimension of the reflective surface 120, illuminates the reflective mirror 120, with the main body 110 of the optical scanner 104 not being treated to be anti-reflective.

In this comparative example, the laser beam, upon traveling toward the reflective surface 120 for illumination, enters the entire region of the reflective surface 120. Additionally, the laser beam enters a surrounding area of the main body 110 outside and adjacent to the reflective surface 120, which is to say, a combination of a part of the mirror-side leaf spring 142 and a part of the fixed frame 116, for each beam member 140.

For this reason, in the comparative example, as illustrated in an upper right-hand portion of FIG. 8, it follows that light reflected from the main body 110 includes: normal reflected-light which is produced by reflection of the desired segment of light from the reflective surface 120; and disturbing reflected-light which is produced by unintended reflection of the undesired segment of light from the aforementioned surrounding area of the main body 110.

In the comparative example, not only the normal reflected-light but also the disturbing reflected-light are relayed to the vertical scanning sub-system 102 by the relay optical system 212, and eventually both enter the image plane of the retina 14. For this reason, noises are unexpectedly introduced into an image to be viewed by the viewer.

Such noises may include two noises different in type. Where the disturbing reflected-light is light reflected from the mirror-side leaf springs 142, which oscillates integrally with the reflective surface 120, there is produced, for example, a flickering type of noise appearing entirely on a displayed image. In addition, where the disturbing reflected-light is light reflected from the fixed frame 116, which is held stationary, there is produced, for example, a standing or static type of noise appearing locally on a displayed image.

Figure 9:
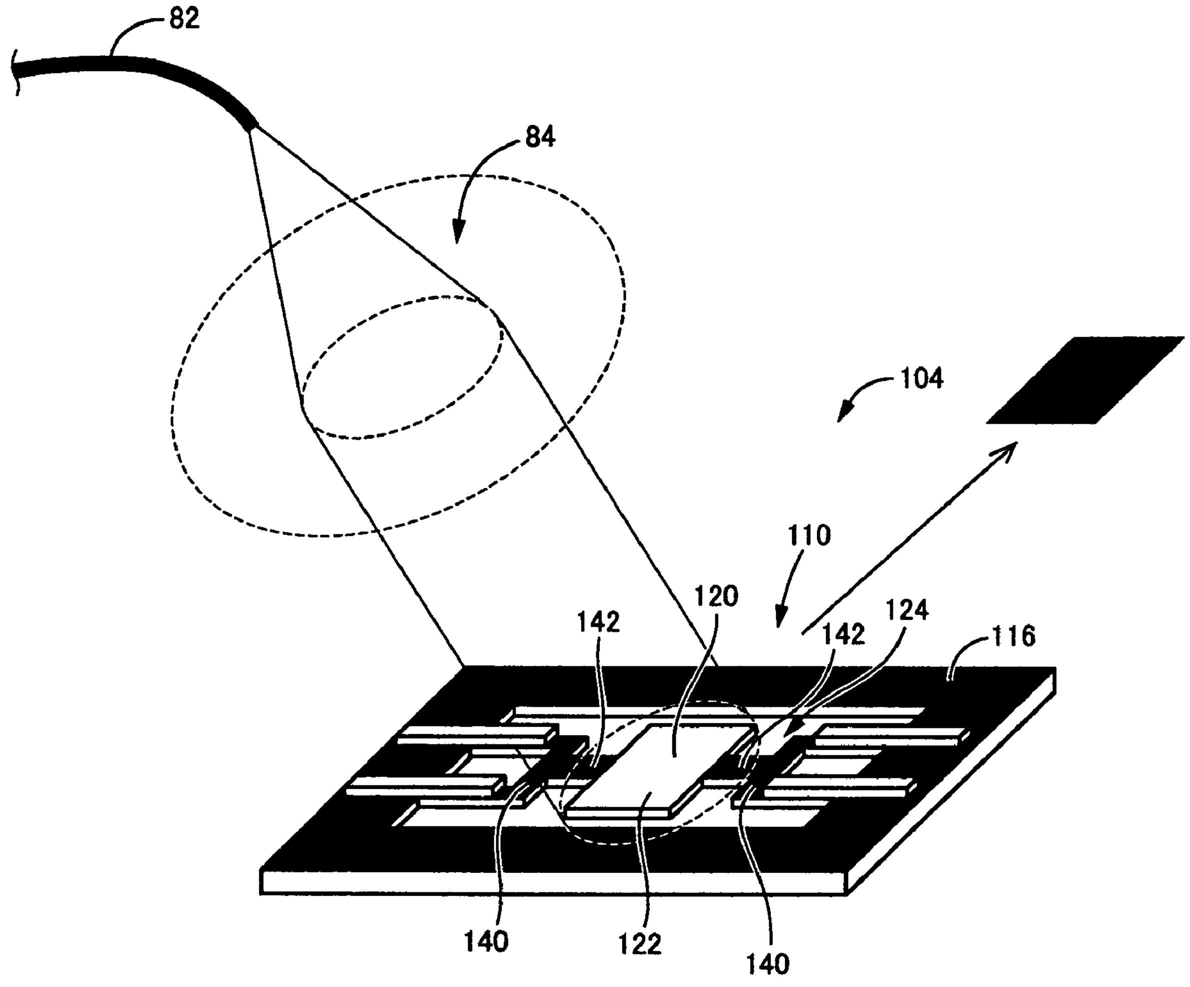
FIG. 9 is a perspective view for explaining reflected light emerging from the optical scanner 104 depicted in FIG. 2, as a result of the impingement of a laser beam on the optical scanner 104 which is treated to be anti-reflective.

In the present embodiment, as illustrated in FIG. 9, such noises are reduced or prevented by imparting non-reflective coatings to selected ones of the components of the optical scanner 104 which are likely to receive the undesired segment of light. In FIG. 9, the imparted non-reflective coatings are depicted as respective black areas. In the present embodiment, among all the components of the optical scanner 104, the beam members 140 and 140 and the fixed frame 116 are selected to be treated to be non-reflective.

As illustrated in FIG. 9, application of a non-reflective coating is one of processes of blackening a "treated surface" which is expected to be treated to be anti-reflective, to thereby reduce a reflectance or reflection ratio of the treated surface.

An example of a non-reflective coating is a black oxide layer of electroless-nickel-plating. This layer is produced by oxidizing a treated surface to which electroless nickel plating has been applied. As a result of the oxidization, there is produced on the treated surface black acicular crystals to form an oxide film, which provides improved non-reflective function.

Because the oxide film on the treated surface is chemically stable and is remarkably improved in dimensional accuracy and corrosion resistance, the oxide film is suitable for use even under a severe condition (such as high-temperature atmosphere, for example) Alternative examples of a non-reflective coating are raised as a black chrome-plated layer, a black nickel-plated layer, etc.

As mentioned above, in the present embodiment, the beam members 140 and 140 and the fixed frame 116 of the optical scanner 104 are reduced in reflectivity because of the non-reflective coating.

As illustrated in FIG. 9, the present embodiment therefore prevents deterioration in image quality due to light unexpectedly reflected from the beam members 140 and 140 and the fixed frame 116, even though the undesired segment of light of a laser beam enters the beam members 140 and 140 and the fixed frame 116 which are components other than the reflective surface 120 within the optical scanner 104.

Accordingly, the present embodiment makes it easier to achieve an increase in transverse cross-section of a laser beam traveling toward the reflective surface 120 for illumination, to thereby achieve an increase in area of a light-entrance region which the laser beam enters, without adversely affecting the normal or proper reflected-light from the reflective surface 120. The present embodiment further makes it easier to achieve higher resolution by increasing the area of the light-entrance region.

As is evident from the above description, in the present embodiment, the optical scanner 104 constitutes an example of the "optical scanner" according to the above mode (1), and the laser beam constitutes an example of the "light" set forth in the same mode.

Further, in the present embodiment, the beam members 140 and 140 and the fixed frame 116, which are coated with respective non-reflective coatings, each constitute an example of the "lower-reflectivity region" set forth in the above mode (2), and each constitute an example of the "lower-reflectance area" set forth in the above mode (3).

Still further, in the present embodiment, the above-described non-reflective coating constitutes an example of the "anti-reflection coating" set forth in the above mode (5), and the beam members 140 and 140 each constitute an example of the "oscillating member" set forth in the above mode (7).

Additionally, in the present embodiment, the reflective mirror member 122 constitutes an example of the "reflective mirror member" set forth in the above mode (8), and the beam members 140 and 140 each constitute an example of the "beam member" set forth in the same mode.

Still additionally, in the present embodiment, the beam members 140 and 140 each constitute an example of the "oscillating member" set forth in the above mode (9), and a portion of each beam member 140 which is adjacent to the reflective surface 120 and which is coated with a non-reflective coating constitutes an example of the "lower-reflectivity region" set forth in the same mode.

Further, in the present embodiment, the fixed frame 116 constitutes an example of the "stationary member" set forth in the above mode (12), and a portion of the fixed frame 116 which is coated with the non-reflective coating constitutes an example of the "lower-reflectivity region" set forth in the same mode.

Still further, in the present embodiment, the light source unit 20 constitutes an example of the "light source" set forth in the above mode (16) or (17), and the scanning unit 24 constitutes an example of the "scanning unit" set forth in the above mode (16) or (18).

It is added that the implementation of the present invention does not essentially require particular application of pre-treatment to the aforementioned treated surface for imparting thereto a non-reflective coating. However, the treated surface, once roughened (e.g., matted) for pre-treatment, is further increased in the non-reflective function. In this regard, the matted treated-surface constitutes an example of the "rougher surface" set forth in the above mode (4).

It is further added that, a reduction in the reflective function of the aforementioned treated surface, although it is achieved, in the present embodiment, by a reduction in the reflectance ratio of the non-reflective coating, may be alternatively achieved by the employment of an anti-reflection coating in the form of a laminate of multiple layers different in the index of refraction (e.g., dielectric thin-films).

Figure 10:
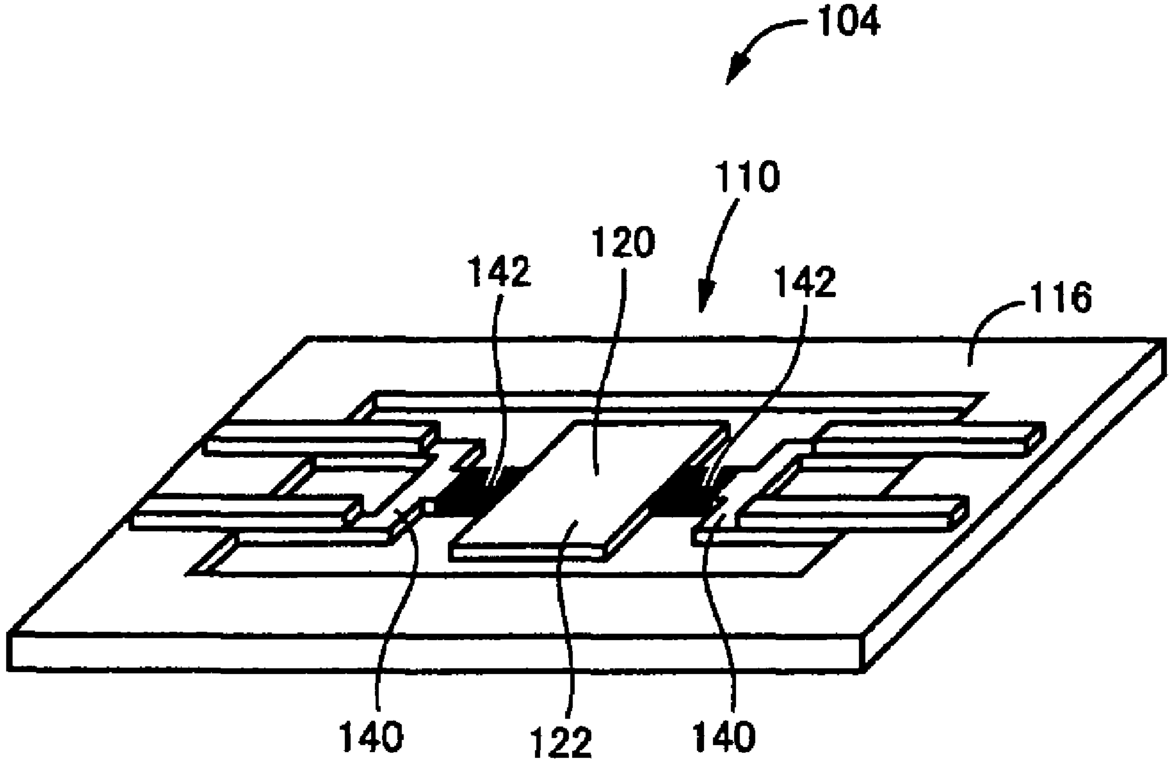
FIG. 10 is a perspective view illustrating a main body 110 of an optical scanner 104 constructed according to a second embodiment of the present invention.

Referring next to FIG. 10, a second embodiment of the present invention will be described.

The present embodiment is in common to the first embodiment concerning many elements, and is different from the first embodiment only concerning non-reflection coated elements.

In view of that, while the common elements of the present embodiment will be referenced the same reference numerals or names as those in the description and illustration of the first embodiment, without redundant description or illustration, the different elements of the present embodiment will be described below in greater detail.

In the first embodiment, the beam members 140 and 140 and the fixed frame 116 are coated with the respective non-reflective coatings, as illustrated in FIG. 9. In contrast, in the present embodiment, as illustrated in FIG. 10, only the beam members 140 and 140 are coated with respective non-reflective coatings, which are depicted as respective black areas in FIG. 10.

In the present embodiment, the optical scanner 104 is configured, such that, once a laserbeam (i.e., illuminating light) travels toward the reflective surface 120 for illumination, only an undesired or unwanted segment of the laser beam enters only the beam members 140 and 140, and does not enter the fixed frame 116. This configuration requires only the beam elements 140 and 140 to be non-reflection coated.

In view of the above findings, the present embodiment, as a result of coating only the beam members 140 and 140 of the optical scanner 104 with respective non-reflective coatings, eliminates degradation in image quality due to unintended reflection of an undesired segment of the illuminating light. Therefore, the present embodiment promotes elimination of waste non-reflective coatings.

Figure 11:
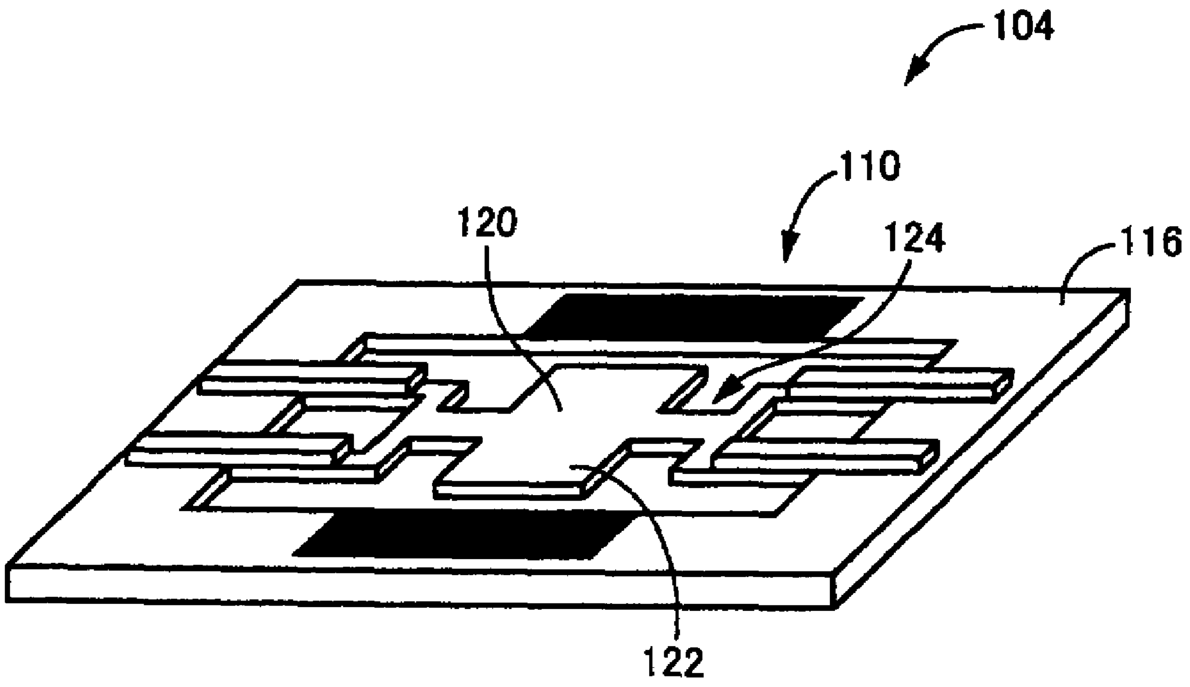
FIG. 11 is a perspective view illustrating a main body 110 of an optical scanner 104 constructed according to a third embodiment of the present invention.

Referring next to FIG. 11, a third embodiment of the present invention will be described.

The present embodiment is in common to the first embodiment concerning many elements, and is different from the first embodiment only concerning non-reflection coated elements.

In view of the above, while the common elements of the present embodiment will be referenced the same reference numerals or names as those in the description and illustration of the first embodiment, without redundant description or illustration, the different elements of the present embodiment will be described below in greater detail.

In the first embodiment, the beam members 140 and 140 and the fixed frame 116 are fully coated with the non-reflective coatings, as illustrated in FIG. 9. In contrast, in the present embodiment, as illustrated in FIG. 11, only the fixed frame 116 is partially coated with respective non-reflective coatings, which are depicted as respective black areas in FIG. 11.

As described above, reflection of an undesired segment of the illuminating light causes two noises different in type, one of which is a standing or static noise due to disturbing reflected-light which is generated as a result of the undesired segment of the illuminating light being unexpectedly reflected from the surface of the fixed frame 116, the other of which is a flickering noise due to disturbing reflected-light which is generated as a result of the undesired segment of the illuminating light being unexpectedly reflected from the surface of the beam members 140 and 140.

In certain circumstances, the standing noise causes the viewer to perceive degradation in image quality more strongly than the flickering noise.

In view of the above findings, in the present embodiment, the fixed frame 116 of the optical scanner 104 is coated with non-reflective coatings. The non-reflective coatings are imparted to not an entire region of the fixed frame 116, but only a region of the fixed frame 116 which the undesired segment of the illuminating light enters.

Figure 12:
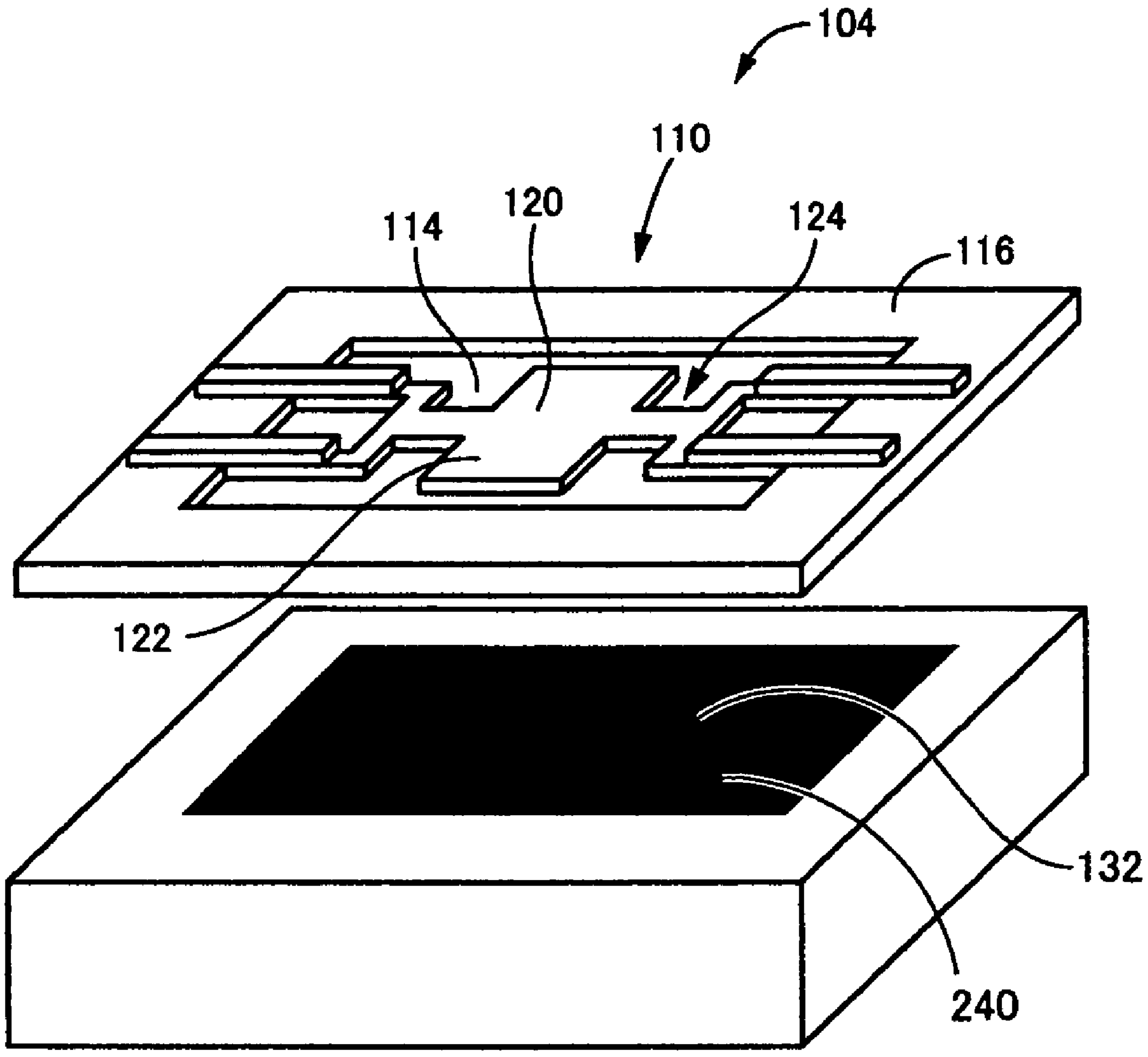
FIG. 12 is an exploded perspective view illustrating a main body 110 of an optical scanner 104 constructed according to a fourth embodiment of the present invention.

Referring next to FIG. 12, a fourth embodiment of the present invention will be described.

The present embodiment is in common to the first embodiment concerning many elements, and is different from the first embodiment only concerning non-reflection coated elements.

In view of that, while the common elements of the present embodiment will be referenced the same reference numerals or names as those in the description and illustration of the first embodiment, without redundant description or illustration, the different elements of the present embodiment will be described below in greater detail.

In the first embodiment, the beam members 140 and 140 and the fixed frame 116 are coated with the respective non-reflective coatings, as illustrated in FIG. 9. In contrast, in the present embodiment, as illustrated in FIG. 12, the base 112 is coated with a non-reflective coating at a surface 240 of the recess 132 formed within the base 112, which is depicted as a black area in FIG. 12.

As described above, the main body 110 is provided with the through hole 114 to form a clearance between the oscillating body 124 and the fixed frame 116. This enables a laser beam (i.e., illuminating light) to pass through the through hole 114 and then to reach the recess 132 located within the base 112. An undesired segment of the illuminating light, upon entry into and reflection from the surface 240 of the recess 132, turns out to be disturbing reflected-light which can adversely affect a displayed image.

In view of the above findings, the present embodiment, as a result of coating the surface 240 of the recess 132 with the non-reflective coating, eliminates degradation in image quality due to unintended reflection of an undesired segment of the illuminating light.

As will be readily understood from the above explanation, in the present embodiment, the recess 132 constitutes an example of the "stationary member" set forth in the above mode (12), and the surface 240 of the recess 132 constitutes an example of the "lower-reflectivity region" set forth in the same mode.

Figure 13:
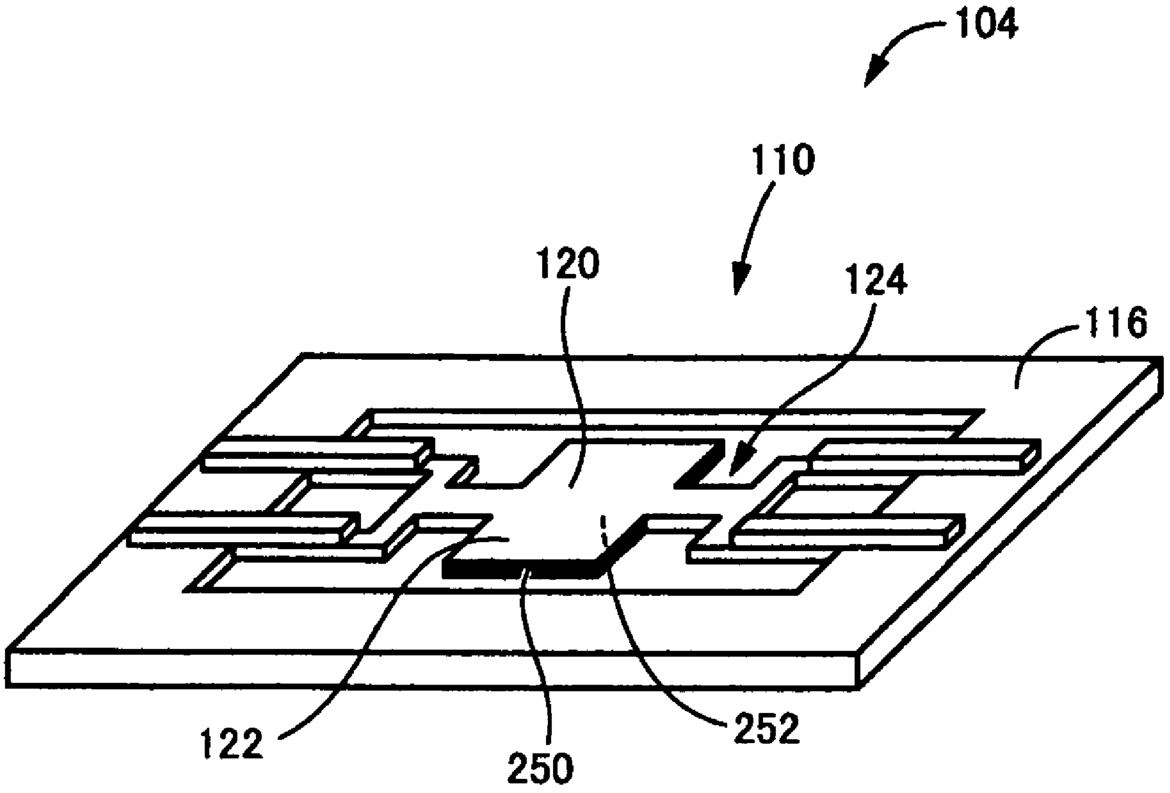
FIG. 13 is a perspective view illustrating a main body 110 of an optical scanner 104 constructed according to a fifth embodiment of the present invention.

Referring next to FIG. 13, a fifth embodiment of the present invention will be described.

The present embodiment is in common to the first embodiment concerning many elements, and therefore, while the common elements of the present embodiment will be referenced the same reference numerals or names as those in the description and illustration of the first embodiment, without redundant description or illustration, the different elements of the present embodiment will be described below in greater detail.

In the first embodiment, the reflective mirror member 122 is not treated to be anti-reflective. In contrast, in the present embodiment, the reflective mirror member 122 is treated to be anti-reflective, more specifically, at a local surface of the reflective mirror member 122 excluding the reflective surface 120.

Still more specifically, as illustrated in FIG. 13, a lateral face 250 of the reflective mirror member 122 which is adjacent to the reflective surface 120, and a back face 252 of the reflective mirror member 122 opposite to the reflective surface 120 are coated with respective non-reflective coatings.

That is to say, at least a region of the lateral face 250 which is varied in the angle formed with respect to a direction of the illuminating light during oscillation of the reflective surface 120, is non-reflection coated.

As described above, the reflective mirror member 122 is oscillated about the oscillation axis 134 for a scanning operation. For this reason, as illustrated in FIG. 14(*a*), a laser beam enters the reflective surface 120 without entering the lateral face 250, in a neutral position of the reflective mirror member 122 which allows the laser beam to enter perpendicularly the reflected surface 120 of the reflective mirror member 122.

Figure 14:
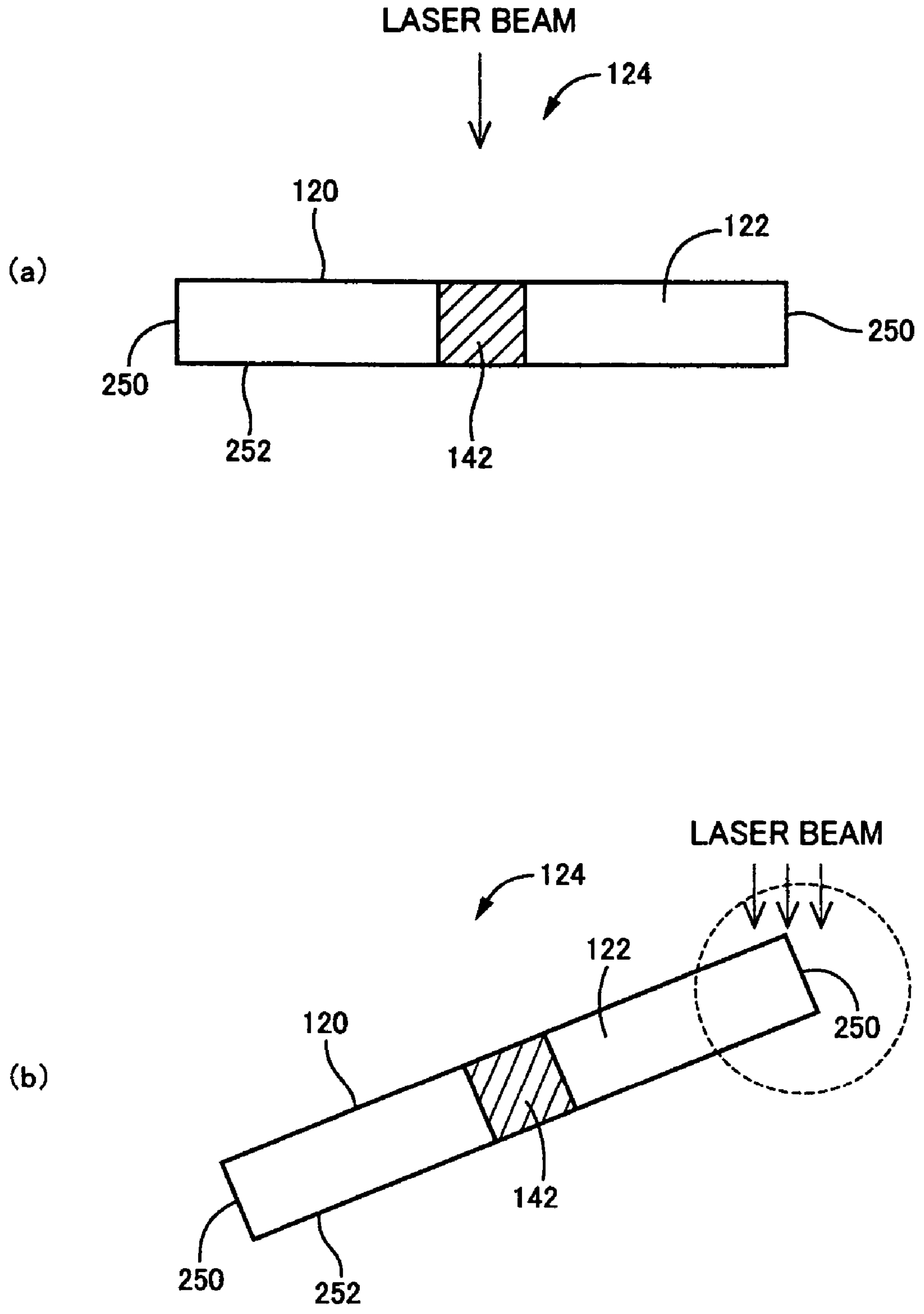
FIGS. 14(*a*) and 14(*b*) are sectional side views illustrating a reflective mirror member 122 of an oscillating body 124 depicted in FIG. 13, when located in a frontal or neutral position, and when located in any one of oblique or tilted positions, respectively.

In contrast, as illustrated in FIG. 14(*b*), a laser beam enters not only the reflective surface 120 but also the lateral face 250, in tilted positions of the reflective mirror member 122 away from the neutral position. A laser beam, upon entry into and reflection from the lateral face 250, turns out to be disturbing reflected-light which can adversely affect a displayed image.

Additionally, if an undesired segment of a laser beam enters and reflected from the back face 252 of the reflective mirror member 122, then the reflection can adversely affects a displayed image.

In view of the above findings, the present embodiment, as a result of coating the lateral face 250 and the back face 252 both of the reflective mirror member 122 with the respective non-reflective coatings, prevents unintended reflection of an undesired segment of the incoming light from the reflective surface 122.

It is added that the present invention may be alternatively embodied in a manner in which, for example, lateral faces of the beam members 140 and 140 and/or lateral faces of the fixed frame 116 are non-reflection coated.

As will be readily understood from the above explanation, in the present embodiment, the reflective mirror member 122 constitutes an example of the "oscillating member" set forth in the above mode (7), and the lateral face 250 and the back face 252 both of the reflective mirror member 122 each constitute an example of the "lower-reflectivity region" set forth in the same mode.

Figure 15:
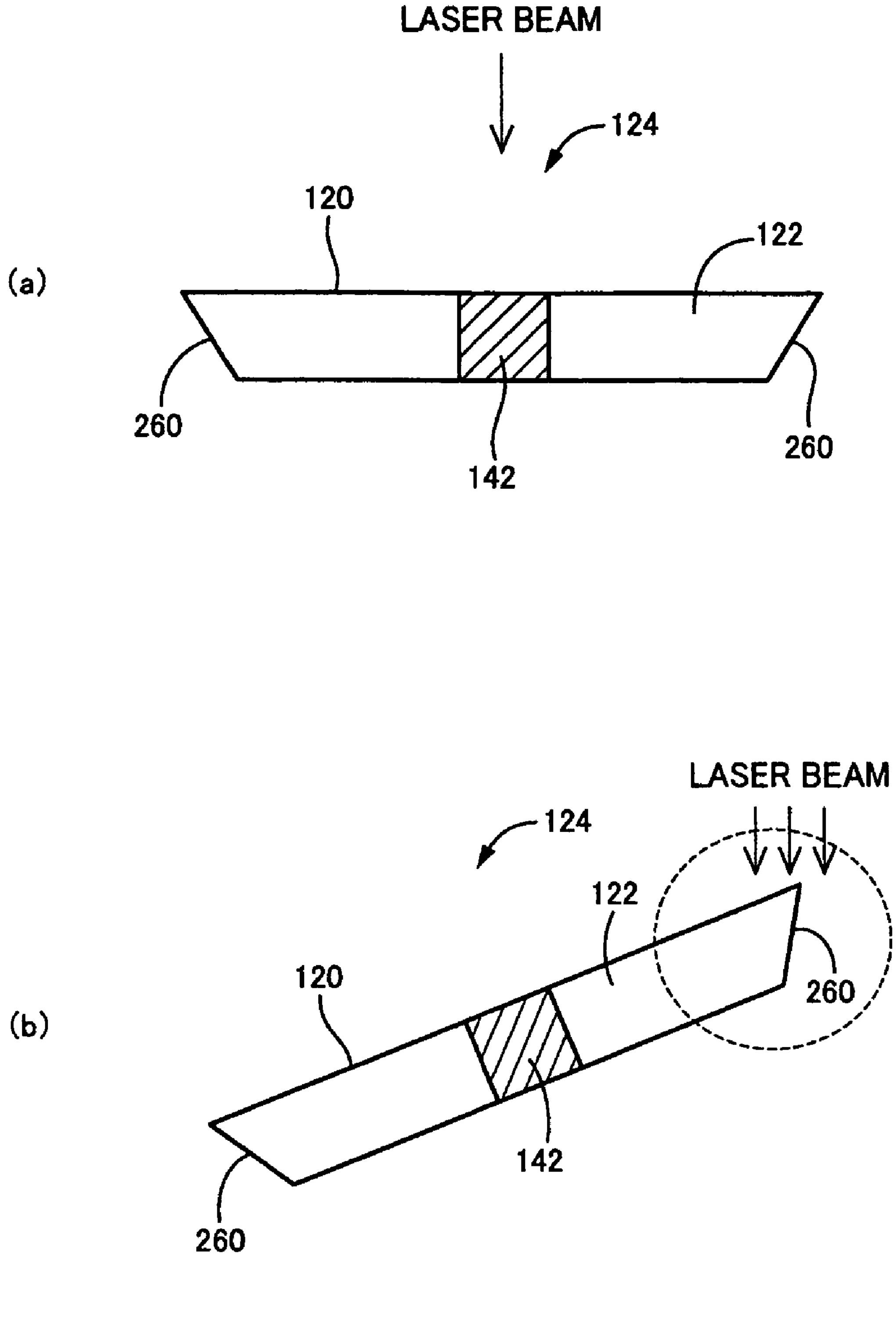
FIGS. 15(*a*) and 15(*b*) are sectional side views illustrating an reflective mirror member 122 of an optical scanner 104 constructed according to a sixth embodiment of the present invention, when located in a frontal or neutral position, and when located in any one of oblique or tilted positions, respectively.

Referring next to FIG. 15, a sixth embodiment of the present invention will be described.

The present embodiment is in common to the fifth embodiment concerning many elements, and therefore, while the common elements of the present embodiment will be referenced the same reference numerals or names as those in the description and illustration of the first embodiment, without redundant description or illustration, the different elements of the present embodiment will be described below in greater detail.

In the fifth embodiment, an anti-reflection treatment is effected by coating the lateral face 250 of the reflective mirror member 122 with anon-reflective coating. In contrast, in the present embodiment, as illustrated in FIG. 15(*a*), the reflective mirror member 122 is processed to be shaped such that the reflective surface 120 and a lateral face 260 of the reflective mirror member 122 intersect acutely each other, which is to say, such that the lateral face 260 of the reflective mirror member 122 is obliquely inclined with respect to the reflective surface 120.

In the fifth embodiment, as illustrated in FIG. 14(*b*), the reflective surface 120 and the lateral face 250 intersect perpendicularly each other, and therefore, a laser beam enters the lateral face 250 of the reflective mirror member 122 in the tilted positions of the reflective mirror member 122 away from the neutral position.

In contrast, in the present embodiment, as illustrated in FIG. 15(*b*), because the reflective surface 120 and the lateral face 260 acutely intersects each other in the reflective mirror member 122, a laser beam passes through the lateral face 260 without entering the lateral face 260, in the tilted positions of the reflective mirror member 122. This configuration prevents an undesired segment of the incoming laser beam from being unexpectedly reflected from the lateral face 260, resulting in no generation of disturbing reflected-light from the lateral face 260.

Referring now to the process diagram illustrated in FIG. 16, there will be described in greater detail an example of a technique of processing the lateral face 260 of the reflective mirror member 122 in the shape of an obliquely inclined or slant plane.

Generally, this technique is implemented to chamfer or slant the lateral face 260 of the reflective mirror member 122 by a wet etching process, by deploying etching-rate anisotropy of a material dependent on crystal-plane-orientation during a wet etching process.

Figure 16:
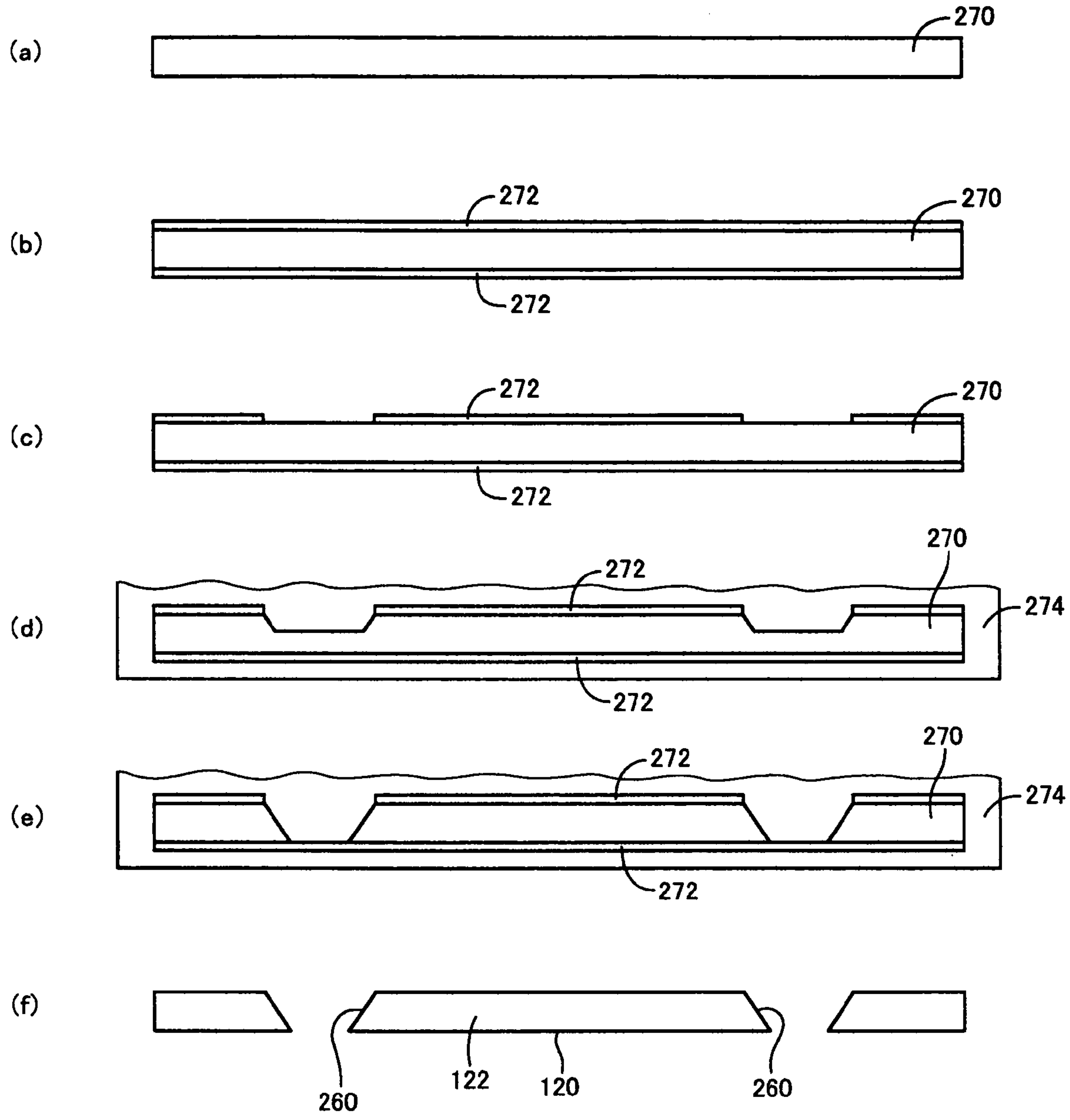
FIG. 16 is a sectional side view for explaining in time series a process of fabricating the reflective mirror member 122 depicted in FIG. 15.

More specifically, first of all, as illustrated in FIG. 16(*a*), a silicon wafer (with a thickness of 100 μm, for example) is prepared for an etched material 270 for fabricating the reflective mirror member 122.

Next, as illustrated in FIG. 16(*b*), the etched material 270 is coated at both faces with etching masks 272. Each etching mask 272 is, for example, an oxide film formed at both faces of the etched material 270 as a result of heating of each etched material 270.

Subsequently, as illustrated in FIG. 16(*c*), a selected one of the etching masks 272 and 272 (an upper etching mask 272, in an example illustrated in FIG. 16(*c*)) is patterned to form a predetermined pattern by a lithographic technique.

Thereafter, as illustrated in FIG. 16(*d*), a laminate of the etched material 270 and the etching mask 272 is dipped into an etching bath 274 of potassium hydroxide water (KOH) or tetramethyl ammonium hydroxide (TMAH) as an etchant.

As the wet etching process is advanced, the etched material 270 is gradually and anistropically etched, and finally, there are produced exposed surfaces each coincident with a (111)-crystal plane which forms an angle of 54.7 degree. with respect to the surface of the reflective mirror member 122.

As illustrated in FIG. 16(*e*), upon completion of the etching process, a silicon wafer (the aforementioned laminate) is withdrawn from the etching bath 274. Thereafter, as illustrated FIG. 16(*f*), the etching mask 272 is removed from the etched material 270, resulting in completion of the reflective mirror member 122 with the lateral face 260 being fully circumferentially in the form of a slant plane.

Figure 17:
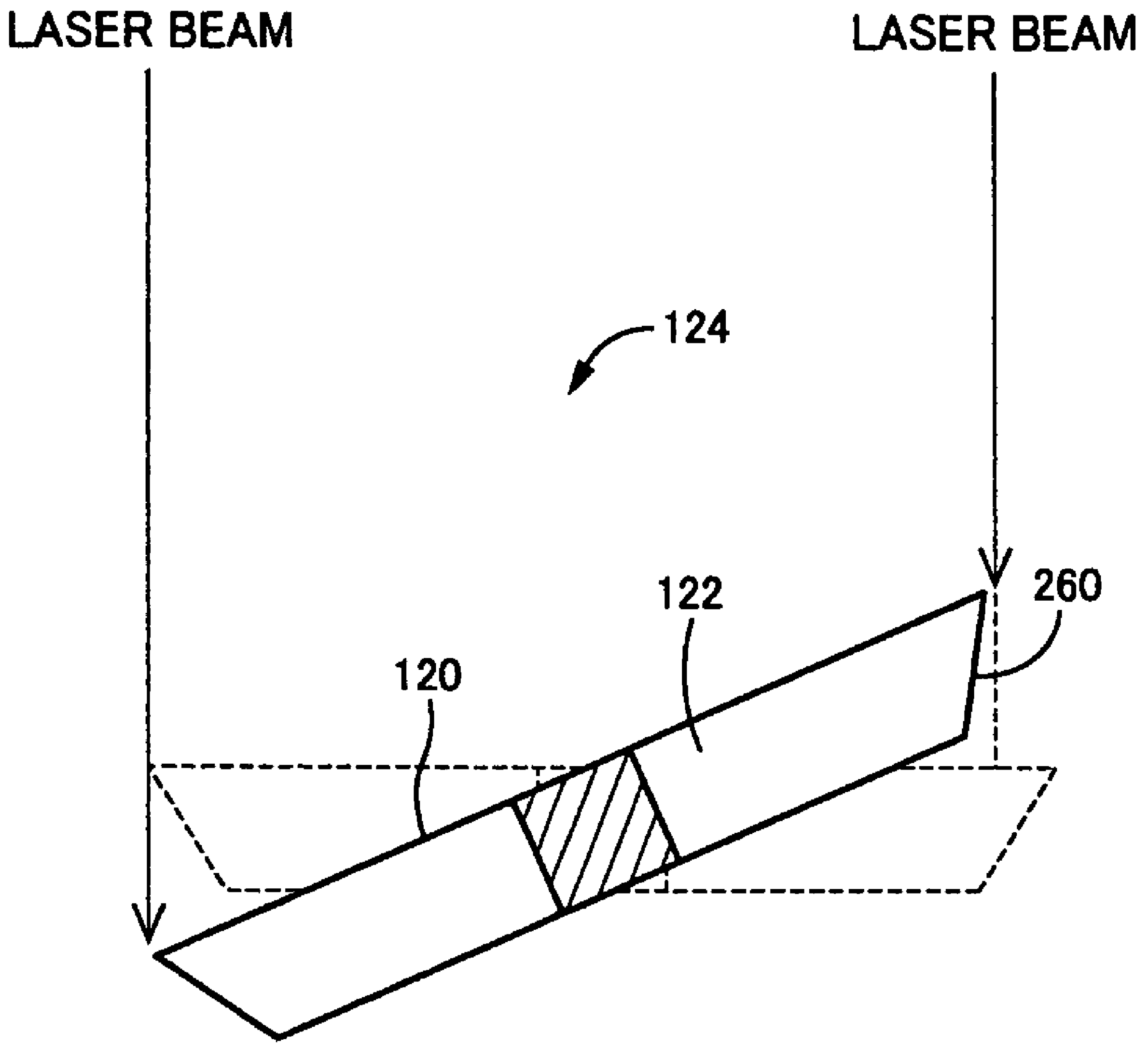
FIG. 17 is a sectional side view illustrating the reflective mirror member 122 depicted in FIG. 15, when located in an extreme one of the tilted positions.

As described above, the lateral face 260 of the reflective mirror member 122, which is fabricated by the wet etching process, has a slant angle of 54.7 degree. with respect to the surface of the reflective mirror member 122. As illustrated in FIG. 17, this slant angle has a magnitude adequate enough to prevent a laser beam from entering the lateral face 260, even in an extreme one of the tilted positions of the reflective mirror member 122 which is indicated in solid lines.

Therefore, the present embodiment allows an undesired segment of the incoming laser beam to pass through the reflective mirror member 122 without any reflection therefrom.

As is evident from the above description, in the present embodiment, the lateral face 260 of the reflective mirror member 122 constitutes an example of the "lower-reflectivity region" set forth in the above mode (2), and also constitutes an example of the "light-passing area" set forth in the above mode (6).

Further, in the present embodiment, the reflective mirror member 122 constitutes an example of the "oscillating member" set forth in the above mode (7), and the lateral face 260 constitutes an example of the "lower-reflectivity region" set forth in the same mode.

It is added that the present invention may be alternatively practiced in a combination of selected ones of these first to sixth embodiments described above as desired.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An optical scanner comprising:

a reflective surface from which incoming light is reflected; and a scanning sub-system altering an angle of the reflective surface, relative to an entry direction in which the incoming light enters the reflective surface, to thereby perform a scanning operation of reflected light from the reflective surface, wherein the reflective surface is illuminated for the scanning operation, with illuminating light having a diameter such that the illuminating light together generates a desired segment of light entering the entire reflective surface and an undesired segment of light not entering the reflective surface, whereby the entire reflective surface is filled with the illuminating light.

2. The optical scanner according to claim 1, further comprising a reflective mirror member having an obverse face at which the reflective surface is formed and a non-obverse face excluding the obverse face, and a lower-reflectivity region configured to reflect the undesired segment of light with reflectivity lower than reflectivity with which the reflective surface reflects the desired segment of light, wherein the lower-reflectivity region is disposed in the reflective mirror member only at the non-obverse face.

3. The optical scanner according to claim 2, wherein the lower-reflectivity region comprises a lower-reflectance area which the undesired segment of light enters and which reflects the entered undesired segment of light with reflectance lower than reflectance with which the reflective surface reflects the desired segment of light.

4. The optical scanner according to claim 3, wherein the lower-reflectance area has a light-entrance surface which the undesired segment of light enters and which is rougher than the reflective surface.

5. The optical scanner according to claim 3, wherein the lower-reflectance area has a light-entrance surface which the undesired segment of light enters and which is coated with an anti-reflection coating.

6. The optical scanner according to claim 2, wherein the lower-reflectivity region comprises a light-passing area allowing passing of the undesired segment of light without reflection.

7. The optical scanner according to claim 2, wherein the scanning sub-system includes an oscillating member oscillating together with the reflective surface for the scanning operation, wherein the lower-reflectivity region is formed at the oscillating member.

8. The optical scanner according to claim 7, further comprising:

an elastic beam member connected with the reflective mirror member for allowing torsional vibration of the reflective mirror member.

9. The optical scanner according to claim 8, wherein the beam member functions as the oscillating member, and wherein the lower-reflectivity region is formed at at least a part of the beam member which is disposed adjacent to the reflective surface.

10. The optical scanner according to claim 8, wherein the reflective mirror member configured to have an obverse face at which the reflective surface is formed and a non-obverse face excluding the obverse face, for functioning as the oscillating member, and wherein the lower-reflectivity region is formed at at least a part of the non-obverse face.

11. The optical scanner according to claim 10, wherein the non-obverse face includes a lateral face adjacent to the obverse face, the lateral face disposed to acutely intersect the obverse face at its outer edge.

12. The optical scanner according to claim 2, further comprising a stationary member held stationary during motion of the reflective surface, wherein the lower-reflectivity region is formed at the stationary member.

13. The optical scanner according to claim 12, wherein the scanning sub-system includes:

a main body oscillating the reflective surface for the scanning operation, the main body being formed as an integral combination of: (a) a reflective mirror member at which the reflective surface is formed; (b) a fixed member; and (c) an elastic beam member supported by the reflective mirror member and the fixed member at both ends of the beam member, for allowing torsional vibration of the reflective mirror member; and a base to which the main body is to be attached.

14. The optical scanner according to claim 13, wherein the fixed member functions as the stationary member, and wherein the lower-reflectivity region is formed at at least a part of the fixed member.

15. The optical scanner according to claim 13, wherein the base functions as the stationary member, and wherein the lower-reflectivity region is formed at at least a part of the base.

16. An apparatus for forming an image through scan of light, comprising:

a light source emitting the light; and a scanning unit scanning the light emitted from the light source, including an optical scanner, wherein the optical scanner includes:

a reflective surface from which incoming light is reflected; and a scanning sub-system altering an angle of the reflective surface, relative to an entry direction in which the incoming light enters the reflective surface, to thereby perform a scanning operation of reflected light from the reflective surface, wherein the reflective surface is illuminated for the scanning operation, with illuminating light having a diameter such that the light together generates a desired segment of light entering the entire reflective surface and an undesired segment of light not entering the reflective surface, whereby the entire reflective surface is filled with the illuminating light.

17. The apparatus according to claim 16, further comprising a reflective mirror member having an obverse face at which the reflective surface is formed and a non-obverse face excluding the obverse face, and a lower-reflectivity region configured to reflect the undesired segment of light with reflectivity lower than reflectivity with which the reflective surface reflects the desired segment of light, wherein the lower-reflectivity region is disposed in the reflective mirror member only at the non-obverse face.

18. The apparatus according to claim 16, wherein the scanning unit is configured to perform a primary scan for scanning the light in a primary scan direction, and performs a secondary scan for scanning the light in a secondary scan direction intersecting the primary scan direction at a rate lower than that of the primary scan, and wherein the optical scanner is used for performing the primary scan.

19. The apparatus according to claim 1, wherein the reflective surface is configured to have a maximum dimension which the diameter of the illuminating light exceeds.

20. The optical scanner according to claim 1, further comprising a reflective mirror member at which the reflective surface is formed, wherein the reflective mirror member is configured to have a maximum dimension which the diameter of the illuminating light exceeds.

* * * * *